United States Patent
Umeda et al.

(10) Patent No.: US 7,466,377 B2
(45) Date of Patent: Dec. 16, 2008

(54) RETARDATION FILM, MANUFACTURING METHOD THEREOF, POLARIZING PLATE AND LIQUID CRYSTAL DISPLAY APPARATUS

(75) Inventors: Hiroki Umeda, Hino (JP); Noriyasu Kuzuhara, Kunitachi (JP); Shinji Inagaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 292 days.

(21) Appl. No.: 11/508,233

(22) Filed: Aug. 23, 2006

(65) Prior Publication Data

US 2007/0046865 A1    Mar. 1, 2007

(30) Foreign Application Priority Data

Aug. 26, 2005 (JP) .............................. 2005-245741

(51) Int. Cl.
*G02F 1/1335* (2006.01)
*G02F 1/13* (2006.01)

(52) U.S. Cl. .................... 349/96; 349/117; 349/187

(58) Field of Classification Search ............ 349/96, 349/100, 104, 87, 193, 194, 187, 116, 117, 349/118

See application file for complete search history.

(56) References Cited

U.S. PATENT DOCUMENTS

| | | | |
|---|---|---|---|
| 4,427,741 A * | 1/1984 | Aizawa et al. | 428/332 |
| 6,747,801 B2 * | 6/2004 | Umemoto et al. | 359/599 |
| 7,379,131 B2 * | 5/2008 | Ito et al. | 349/96 |
| 2001/0012159 A1 * | 8/2001 | Umemoto et al. | 359/599 |
| 2005/0243245 A1 * | 11/2005 | Taguchi et al. | 349/96 |
| 2007/0046865 A1 * | 3/2007 | Umeda et al. | 349/96 |
| 2008/0062366 A1 * | 3/2008 | Ohtani et al. | 349/122 |

* cited by examiner

*Primary Examiner*—Brian M Healy
(74) *Attorney, Agent, or Firm*—Finnegan, Henderson, Farabow, Garrett & Dunner, L.L.P.

(57) ABSTRACT

A film bonded to a polarizer of a polarizing plate, has a surface A and a surface B opposite to the surface A; and a thickness of 10 μm to 70 μm; wherein a refractive index difference between the surface A and the surface B is $5 \times 10^{-4}$ to $5 \times 10^{-3}$.

23 Claims, 3 Drawing Sheets

US 7,466,377 B2

RETARDATION FILM, MANUFACTURING METHOD THEREOF, POLARIZING PLATE AND LIQUID CRYSTAL DISPLAY APPARATUS

This application is based on Japanese Patent Application No. 2005-245741 filed on Aug. 26, 2005, in Japanese Patent Office, the entire content of which is hereby incorporated by reference.

BACKGROUND OF THE INVENTION

The present invention relates to a retardation film, manufacturing method thereof, polarizing plate and liquid crystal display apparatus, particularly to a retardation film with its curl having been improved for suitable use in a polarizing plate, the manufacturing method thereof, the polarizing plate and liquid crystal display apparatus using this retardation film.

The liquid crystal display apparatus is characterized by low voltage and low power consumption. It can be directly coupled to an IC circuit, and can be built into a thin configuration. Because of these advantages, the liquid crystal display apparatus has an extensive use as a display for word processors or personal computers. This liquid crystal display apparatus is basically structured in such a way that a polarizing plate is provided on one or both surfaces of a liquid crystal cell. The polarizing plate allows the passage of light only on the plane of polarization in a certain direction. In the liquid crystal image display apparatus, the polarizing plate plays a major role of ensuring that a change in orientation due to electric field is visible. The performance of the liquid crystal display apparatus heavily depends on the performance of the polarizing plate.

The polarizing plate is commonly structured as follows: For example, a protective film made of such a cellulose ester film as a cellulose triacetate film and cellulose acetate propionate film is bonded on one or both surfaces of the polarizer made up of polyvinyl alcohol film has been subjected to uniaxial drawing and iodine dyeing, or the retardation plate is further bonded on the aforementioned protective film through an additive as polyvinyl alcohol. Further, this polarizing plate is bonded to the liquid crystal cell through the adhesive layer.

In recent years, there is a tendency for the growing size of a liquid crystal display apparatus and the reducing thickness of the polarizing plate used therein. One of the big problems in the process of manufacturing is concerned with the absolute value for the size of curl when the polarizing plate is bonded on the glass of a liquid crystal cell, i.e. the height of the end of the cut polarizing plate raised from the horizontal plane or the height of the raised central portion of the cut polarizing plate. If the curl occurring to the aforementioned polarizing plate is not properly adjusted, when the polarizing plate is bonded to the panel, the plate will be raised or will be impregnated with bubbles. Alternatively, the angle of the plate will be misaligned. If such a problem has occurred, the polarizing plate having been bonded must be removed. This will take much time and labor. Alternatively, this problem may lead to the failure to use the panel per se, and hence a still bigger problem of reduced yield. This problem is serious especially when a thin film polarizing plate is manufactured.

An electric field control birefringent mode is often used in a large-sized liquid crystal display apparatus. In the VA or OCB system, the retardation plate is used in some cases. When the retardation plate is employed, a retardation plate can be bonded on a conventional polarizing plate. However, when this method is used, there is a reduction of the yield due to bonding error. Further, it is often very difficult to control the curl of the final polarizing plate product due to the lack of direct bondage with the polarizing film. To solve this problem, the function of the polarizing plate protective film is built into the retardation plate, which is bonded directly onto the polarizer. This art is effective in reducing the thickness of the polarizing plate.

The following arts are disclosed to control the curl of the polarizing plate: One is the art of controlling the amount of the plasticizer on both surfaces of the polarizing plate protective film to prevent a curl from occurring to the polarizing plate (refer Japanese Non-Examined Patent Publication 2002-258049). The other is the art of ensuring that the curls of the polarizing plate protective films bonded on both surfaces of the polarizer will be oriented opposite to each other (refer Japanese Non-Examined Patent Publication 2002-258050 and Japanese Non-Examined Patent Publication 2004-184809). However, these techniques are not sufficient to control the curl of the polarizing plate used in the manufacture of a large-sized liquid crystal display apparatus.

SUMMARY OF THE INVENTION

The object of the present invention is to provide a retardation film suitable for the manufacture of a thin-film polarizing plate characterized by improved curls, a method of manufacturing such a retardation film, and a polarizing plate and liquid crystal display apparatus using this film.

The object of the present invention can be achieved by the following structures of the present invention:

(1) A film bonded to a polarizer of a polarizing plate, having:
   an A-side surface and a B-side surface opposite to the A-side surface; and
   a thickness of 10 μm to 70 μm;
   wherein a refractive index difference between the A-side surface and the B-side surface is $5 \times 10^{-4}$ to $5 \times 10^{-3}$.

(2) In the film described in (1), the film is a retardation film and the retardation film has an in-plane retardation Ro of 30 nm to 300 nm and a thickness direction retardation Rt of 80 nm to 400 nm for light having a wavelength of 590 nm,
   where the in-plane retardation Ro and the thickness direction retardation Rt are obtained by the following formulas:

$$Ro = (nx - ny) \times d$$

$$Rt = \{(nx + ny)/2 - nz\} \times d,$$

in the formulas, nx represents a refractive index in the direction of a slow axis in a film plane, ny represents a refractive index in the direction of a fast axis in the film plane, nz represents a refractive index in the direction along a film thickness, and d is a film thickness (nm).

(3) In the film described in (1), the film is a protective film for the polarizer.

(4) In the film described in (1), the film contains a cellulose ester as a main component.

(5) In the film described in (4), the film satisfies the following formulas (I) and (II):

$$2.0 \leq X + Y \leq 2.6 \qquad \text{Formula (I)}$$

$$0.1 \leq Y \leq 1.2 \qquad \text{Formula (II)}$$

where X represents a substitution degree of an acetyl group of the cellulose ester and Y represents a substitution degree of a propionyl group or a butyryl group of the cellulose ester.

(6) In the film described in (4), the film contains a plasticizer in the range of from 1% by mass to 20% by mass for the cellulose ester.

(7) In the film described in (6), the content of the plasticizer is in the range of from 3% by mass to 13% by mass.

(8) A polarizing plate, comprises:
a polarizer; and
the film described in claim 1 and bonded to a first surface of the polarizer;
wherein the polarizing plate has a thickness of 70 µm to 140 µm.

(9) In the polarizing plate of (8), the film is a retardation film having a thickness d1 and the polarizing plate further comprises a protective film bonded to a second surface of the polarizer opposite to the first surface and having a thickness d2, and wherein a thickness ratio (d2/d1) of the protective film to the retardation film is 1.1 to 4.0.

(10) In the polarizing plate of (9), the thickness ratio (d2/d1) is 1.1 to 2.0.

(11) A liquid crystal display apparatus, comprises:
a liquid crystal cell,
the polarizing plate described in claim 8 and bonded to a first surface of the liquid crystal cell,
wherein the polarizing plate is bonded in such a way that the film bonded to the first surface of the polarizer is located between the polarizer and the liquid crystal cell.

(12) In the liquid crystal display apparatus described in (11), a protective surface is bonded to a second surface of the polarizer.

(13) In the liquid crystal display apparatus described in (12), the protective film includes at least one of a reflection preventing layer, an antistatic layer, and an antiglare layer.

(14) A method of producing a film, comprises steps of:
casting a liquid onto a support;
peeling off the liquid layer from the support so as to form a web;
conveying the web
drying the conveyed web;
cutting the web so as to form a film having a predetermined size and a thickness of 10 µm to 70 µm;
wherein the conveying step comprises a bending step of bedding the web in such a manner that an A-side surface and a B-side surface opposite to the A-side surface of the web becomes an inner surface alternately, and
wherein in the bending step, when "a" represents a bending radius of the web at the time that the web is bent, a value of (1/a) is in the range of 0.013 to 0.033 $mm^{-1}$, and the bending is repeated from 150 times to 1000 times.

(15) In the method described in (14), the surface of the web contacting the support is the B-side surface and the surface of the web not contacting the support is the A-side surface, the refractive index of the B-side surface is made higher than that of the A-side surface by the bending and a refractive index difference between the A-side surface and the B-side surface is $5\times10^{-4}$ to $5\times10^{-3}$.

(16) In the method described in (14), the value of (1/a) is 0.017 to 0.025 $mm^{-1}$.

(17) In the method described in (14), the bending is repeated 250 times or more.

(18) In the method described in (17), the bending is repeated 350 times or more.

(19) In the method described in (14), in the bending step, an atmosphere temperature is ±30° C. of a glass transition temperature of the web.

(20) In the method described in (19), the atmosphere temperature is ±20° C. of the glass transition temperature of the web.

(21) In the method described in (14), in the bending step, an atmosphere is an inert gas.

(22) In the method described in (14), in the bending step, a conveying speed is 10 m/min. to 150 m/min.

(23) In the method described in (14), further comprises:
a stretching step of stretching the conveyed web before the drying step,
wherein the film is a retardation film and the retardation film has an in-plane retardation Ro of 30 nm to 300 nm and a thickness direction retardation Rt of 80 nm to 400 nm for light having a wavelength of 590 nm,
where the in-plane retardation Ro and the thickness direction retardation Rt are obtained by the following formulas:

$$Ro=(nx-ny)\times d$$

$$Rt=\{(nx+ny)/2-nz\}\times d,$$

in the formulas, nx represents a refractive index in the direction of a slow axis in a film plane, ny represents a refractive index in the direction of a fast axis in a film plane, nz represents a refractive index in the direction along a film thickness, and d is a film thickness (nm).

The present invention provides a retardation film suitable for the manufacture of a thin-film polarizing plate characterized by improved curls, a method of manufacturing such a retardation film, and a polarizing plate and liquid crystal display apparatus using this film.

DETAILED DESCRIPTION OF THE PREFERRED EMBODIMENT

The following describes the details of the best embodiment of the present invention, without the present invention being restricted thereto.

The present invention is characterized in that a long roll-shaped retardation film is used on at least one of the surfaces of the polarizing plate, wherein retardation film is further characterized in that the in-plane retardation Ro at a wavelength of 590 nm expressed by the following equation is 30 nm through 300 nm, retardation Rt along the thickness is 80 nm through 400 nm, the film thickness is 10 µm through 70 µm, and the difference of refractive indexes on two surfaces of the film is $5\times10^{-4}$ or more without exceeding $5\times10^{-3}$.

According to the studies made by the present inventors, it has been revealed that, in a polarizing plate wherein the polarizing film (polarizer) is clamped by two polarizing plate protective films on the front and rear, when the film on the front is different from that on the rear wherein, for example, the function of the retardation plate is built into the polarizing plate protective film arranged on the side of the liquid crystal cell, a curl tends to occur to the polarizing plate. When the polarizing plate is bonded to the panel, the plate will be raised or will be impregnated with bubbles. Alternatively, the angle of the plate will be misaligned. Such problems have been found to occur easily.

In order to avoid the above problems, a film causing a curl in a reverse direction to the direction of an expected curl may be bonded to a polarizing film. However, the present inventor has conceived that a curl causing direction and a curl amount of a film can be controlled by a refractive index difference between a one side surface and the other side surface of a film.

Figure 4:
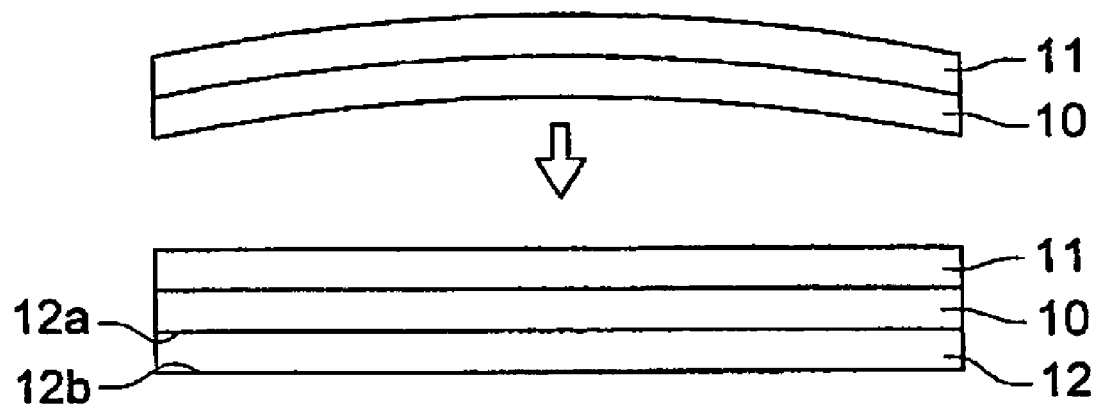
FIG. 4 is an explanatory schematic diagram representing the step of curl correction in the drawing process.

Namely, as shown in FIG. 4, in the case that a curl is caused as shown in FIG. 4 when a film 11 is bonded to a polarizing film 10, by bonding a film 12 according to the present invention in such a way that a surface 12a of the film 12 has a larger refractive index than that of a surface 12b, the curl can be corrected. Further, the larger the refractive index difference is, the greater the correction amount of a curl becomes.

Figure 5:
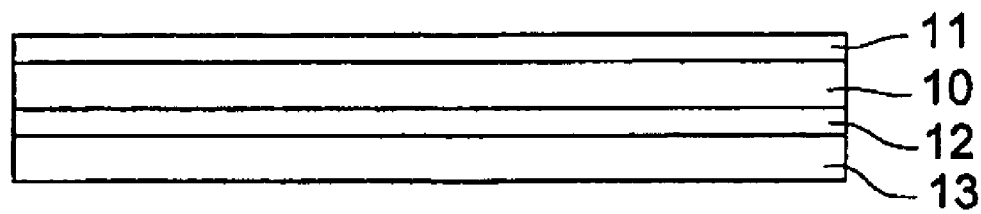
FIG. 5 is an explanatory schematic diagram representing the film arrangement in the drawing process.

When applying a film according to the present invention, since a polarizing plate protective film is arranged farther from the liquid crystal cell, the polarizing plate protective film is more restricted with respect to curl control. Because, a surface treatment may be applied onto the polarizing plate protective film in order to provide a hard coated layer or antireflection layer. Thus, as shown in FIG. 5, the curl of the polarizing plate is preferably controlled by providing a film 12 according to the present invention as a polarizing plate protective film or a retardation film having a function of a polarizing plate protective film at a side closer to the liquid crystal cell 13.

The method of causing a curl to occur in the direction opposite to the estimated direction of the curl in question is exemplified by the co-casting method and double casting method, as well as the method of causing a curl to occur by intentionally changing the percentage of the plasticizer content along the film thickness. These methods, however, involves complicated manufacturing processes and may be insufficient in reproducibility and stability.

The present inventors have made efforts to find out a new method for controlling the curl of a polarizing plate and have succeeded in eliminating the complicated manufacturing method involving intentional change of the percentage of the plasticizer content along the film thickness, by controlling the curl of the polarizing plate which utilizes the film wherein the difference in refractive indexes on two film surfaces is $5 \times 10^{-4}$ or more without exceeding $5 \times 10^{-3}$.

To be more specific, in order to ensure that the difference of refractive indexes on two surfaces of the film is $5 \times 10^{-4}$ or more without exceeding $5 \times 10^{-3}$, the retardation film of the present invention can be produced by the aforementioned retardation film manufacturing method containing the steps (hereinafter referred to as "bending") of bending the aforementioned retardation film at the atmosphere temperature of glass transition point ±30° C. so that the one of the film surfaces will be bent inward; and then bending the aforementioned retardation film so that the other surface will be bent inward; wherein the aforementioned steps are repeated 150 or more through 1000 times exclusive, until the value for 1/a is in the range form 0.013 through 0.033 (mm$^{-1}$) when the radium of the bent film is assumed as "a" (mm).

In the case that a dope solution flows from die to a metallic support to form a web and that a surface of the web contacting the metallic support is a B-side surface and a surface of the web not contacting the metallic support and opposite to the B-side surface is an A-side surface, the refractive index of the B-side surface becomes greater than that of the A-side surface by the bending process. When the number of the bending is increased or when the bending strength is made stronger, the refractive index difference between the B-side surface and the A-side surface becomes larger. Accordingly, it is desirable to adjust the refractive index difference by adjusting the number of the bending or the bending strength in accordance with the strength of a curl to be corrected. It may be preferable to make the refractive index difference to be $1 \times 10^{-4}$ to $5 \times 10^{-3}$.

Inclination of uniformity occurs to the density distribution of the cellulose ester in the film when the process of bending is conducted according to the method of the present invention, and the refractive index is higher on the portion of higher density. The curl is estimated to be produced due to the difference in density.

Hereafter, the present invention is explained to details.

As for a polarizing plate protective film or a polarizing plate protective film (hereinafter, referred as a retardation film) acting also a retardation plate, a cellulose acetate type film, an acrylics type film, a polyester type film, etc. are usually used. Among them, a cellulose ester type film is especially desirable.

(Retardation Film, Polarizing Plate Protective Film)

A retardation film and a polarizing plate protective film according to the present invention are explained to details.

As a requirement for a retardation film having a thickness of 10 to 70 μm according to the present invention and a polarizing plate protective film used in the present invention, to be easy in a production, to have a good adhesive property with a polarizing film and to be transparent optically are listed. Among them, to be a polymer film is preferable.

Transparency, as described in the present invention, refers to visible light transmittance of 60 percent or more, preferably 80 percent or more, and most preferably 90 percent or more.

The polymer film is not particularly limited as long as they exhibit the aforesaid properties. Examples include cellulose ester based film, polyester based film, polycarbonate based film, polyallylate based film, polysulfone (including polyestersulfone) based film, polyester film containing polyethylene terephthalate or polyethylene naphthalate, polyethylene film, polypropylene film, cellophane, cellulose diacetate film, cellulose triacetate film, cellulose acetate propionate film, cellulose acetate butyrate film, polyvinylidene chloride film, polyvinyl alcohol film, ethylene vinyl alcohol film, cyndioctatic polystyrene based film, polycarbonate film, cycloolefin polymer film (Arton, manufactured by JSR Co.), Zeonex and Zeonare (both manufactured by Zeon Corp.), polymethylpentane film, polyether ketone film, polyether ketoneimide film, polyamide film, fluorine resin film, nylon film, polymethyl methacrylate film, acryl film, or glass plates. Of these, preferred are cellulose triacetate film, polycarbonate film, and polysulfone (including polyethersulfone) film. In the present invention, from the viewpoint of production, cost, transparency, isotropy, and adhesion property, preferably employed is cellulose ester film (e.g., Konica Minolta Tac, a trade name, KC8UX2MW, KC4UX2MW, KC8UY, KC4UY, KC5UN, KC12UR, KC8UCR-3, KC8UCR-4 and KC8UCR-5 manufactured by Konica Minolta Opto, Inc.). These films may be melt-casting films or solution-casting films.

In the present invention, as a polarizing plate protective film, cellulose ester based film is preferably used. As cellulose ester, preferably used are cellulose acetate, cellulose acetate butyrate and cellulose acetate propionate, cellulose acetate butyrate film, of these, more preferably used are cellulose acetate butyrate, cellulose acetate naphthalate and cellulose acetate propionate.

Specifically, when X represents the degree of substitution of an acetyl group, while Y represent the degree of substitution of a propionyl group or a butyryl group, a transparent substrate film containing a mixed aliphatic acid ester of cellulose having X and Y in the below ranges can be preferably employed.

$$2.0 \leq X+Y \leq 2.6$$

$$0.1 \leq Y \leq 1.2$$

Further, cellulose acetate propionate with $2.4 \leq X+Y \leq 2.6$ and $1.4 \leq Y \leq 2.3$ (while X+Y corresponds to the total acyl substitution degree) is preferable. Further, cellulose acetate propionate with $2.4 \leq X+Y \leq 2.6$, $1.7 \leq X \leq 2.3$ and $0.1 \leq Y \leq 0.9$ (while X+Y corresponds to the total acyl substitution degree) is more preferable. A hydroxyl group remains in the part where acyl substitution is not carried out. These esters may be prepared through any well known method in the art.

In the case that cellulose is used as a retardation film according to the present invention and a polarizing plate protective film used in the present invention, cellulose as a source material of the cellulose ester of the present invention is not specifically limited, however, usable are cotton linter, wood pulp (obtained from acicular trees or from broad leaf trees) or kenaf. The cellulose esters obtained from these cellulose source materials may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

When an acylation agent is an acid chloride ($CH_3COCl$, $C_2H_5COCl$ or $C_3H_7COCl$), a reaction is carried out using a basic compound such as an amine as a catalyst. Specifically, the reaction can be carried out according to the method disclosed in JP-A No. 10-45804. The cellulose ester used in the present invention is obtained through a reaction using in combination of the above acylation agents depending on the acylation degree. In an acylation reaction to form a cellulose ester, an acyl group reacts with the hydroxyl group of a cellulose molecule. A cellulose molecule is made up of many glucose units connected each other, and a glucose unit contains three hydroxyl groups. The number of hydroxyl groups substituted by acyl groups in a glucose unit is referred to as a degree of acetyl substitution. For example, in the case of cellulose triacetate, all the three hydroxyl groups in one glucose unit are substituted by acetyl groups (practically: 2.6-3.0).

The cellulose ester used for the present invention is not specifically limited, however, preferably employed are mixed fatty acid esters of cellulose in which a propionate group or a butyrate group is bonded to cellulose in addition to an acetyl group, for example, cellulose acetate propionate, cellulose acetate butyrate or cellulose acetate propionate butyrate. The butyryl group which forms butyrate may be linear or branched. Cellulose acetate propionate which contains a propionate group as a substituent is excellent in water resistance, and useful as a film for a liquid crystal display.

An acyl substitution degree can be determined through a method prescribed in ASTM-D817-96.

The number average molecular weight of cellulose ester is desirably 40000-200000, because a mechanical strength at the time of shaping becomes strong, and a dope solution becomes proper viscosity, and more desirably 50000-150000. Moreover, weight average molecular weight (Mw)/number average molecular weight (Mn) is desirably in the ranges of are 1.4-4.5.

The cellulose ester is preferably produced by a method generally called as a solution casting film forming method in which a cellulose ester solution (dope solution) is cast (casting) onto a casting supporter such as an endless metal belt transported infinitely or a rotating metal drum casting) of the dope solution, and carrying out film production through a pressure die.

As an organic solvent used for preparing these dope solutions, it may be desirable for the organic solvent to be able to dissolve cellulose ester and to have a moderate boiling point, for example, methylene chloride, methyl acetate, ethylacetate, amyl acetate, methyl acetoacetate, acetone, tetrahydrofuran, 1,3-dioxolane, 1,4-dioxane, cyclohexanone, ethyl formate, 2,2,2-trifluoro ethanol, 2,2,3,3-tetrafluoro-1-propanol, 1,3-difluoro-2-propanol, 1,1,1,3,3, and 3-hexafluoro-2-methyl-2-propanol, Although 1, 1, 1, 3, 3, and 3-hexafluoro-2-propanol, 2, 2, 3 and 3, and 3- pentafluoro-1-propanol, nitroethane, 1, and 3-dimethyl-2-imidzolinon etc. may be employed, however, organic halogenated compounds, such as methylene chloride, a dioxysolan derivative, methyl acetate, an ethylacetate, acetone, methyl acetoacetate, etc. may be listed up as a desirable organic solvent (namely, good solvent).

Further, as shown in the following film-production process, when drying a solvent from the web (dope solution film) formed on a casting support in a solvent evaporation process, from a viewpoint of preventing foaming in the web, as a boiling point of the organic solvent used, 30-80° C. is desirable, for example, the boiling point of the above-mentioned good solvents are methylene chloride (40.4° C. of boiling points), methyl acetate (56.32° C. of boiling points), acetone (56.3° C. of boiling points), an ethylacetate (76.82° C. of boiling points), etc.

Among the above-mentioned good solvents, methylene chloride or methyl acetate which is excellent in solubility may be used preferably.

In a dope used in the present invention, 1 to 40% by weight of alcohol having a carbon number of 1 to 4 is preferably added in addition to the above described organic solvent. When alcohol is contained in a web, after casting a dope on a support and the solvent being partially evaporated from the web, the relative concentration of alcohol becomes higher and the web begins to gelate. The gelation increases the mechanical strength of the web and makes it easier to peel the web from the support. A smaller concentration of alcohol in a dope may contribute to increase a solubility of cellulose ester in a non-chlorine based organic solvent.

Typical alcohols of 1 to 4 carbon atoms (per molecule) are methanol, ethanol, n-propanol, iso-propanol, n-buthanol, sec-buthanol, and tert-buthanol.

Among these solvents, ethanol is desirable, because the stability of a dope solution is preferable, a boiling point is also comparatively low, drying characteristics are also preferable, and there is no toxicity. It is desirable to use preferably a solvent which contains ethanol 5% by mass to 30% by mass to 70% by mass to 95% by mass of methylene chloride. Methyl acetate can also be used instead of methylene chloride. At this time, a dope solution may be prepares with a cooling solution process.

When using a cellulose ester film for a retardation film according to the present invention and a polarizing plate protective film used for the present invention, it is desirable to contain the following plasticizer from a viewpoint of flexibility, water-vapor permeability, and dimensional stability. As the plasticizer, a phosphate type plasticizer, a phthalate ester plasticizer, a trimellitate type plasticizer, a pyromellitic acid type plasticizer, a glycolate type plasticizer, a citrate plasticizer, a polyester plasticizer, etc. can be used preferably, for example.

As a phosphate type plasticizer, triphenyl phosphate, tricresyl phosphate, cresyl diphenyl phosphate, octyl diphenyl phosphate, diphenyl biphenyl phosphate, trioctyl phosphate, tributyl phosphate, etc.; as a phthalate ester plasticizer, diethyl phthalate, dimethoxy ethyl phthalate, dimethyl phthalate, dioctyl phthalate, dibutyl phthalate, di-2-ethylhexyl phthalate, butyl benzyl phthalate, diphenyl phthalate, dicyclohexyl phthalate, etc.; as a trimellitic acid type plasticizer, tributyl trimellitate, triphenyl trimellitate, triethyl trimellitate, etc.; as a pyromellitic acid ester plasticizer, tetra-butyl pyromeritate, tetra-phenyl pyromeritate, tetra-ethyl pyromeritate, etc.; as a glycolate type plasticizer, triacetin, tributyrin, ethyl phthalyl ethyl glycolate, methyl phthalyl ethyl glycolate, butyl phthalyl butyl glycolate, etc.; as a citrate plasticize, triethyl citrate, tri-n-butyl citrate, acetyl triethyl citrate, acetyl tri-n-butyl citrate, acetyl tri-n-(2-ethylhexyl) citrate, etc.; can be used preferably. As an example of other carboxylate, trimethylolpropane tri benzoate, butyl oleate, methyl ricinoleate acetyl, dibutyl sebacate, and various trimellitate are contained. As a polyester plasticizer, a copolymerization polymer of a dibasic acid., such as an aliphatic group dibasic acid, an alicyclic dibasic acid, and an aromatic group dibasic acid, and glycol can be used. Although the aliphatic group dibasic acid is not limited especially, adipic acid, sebacic acid, phthalic acid, terephthalic acid, 1, and 4-cyclohexyl dicarboxylic acid etc. can be used. As glycol, ethylene glycol, diethylene glycol, 1,3-propylene glycol, 1,2-propylene glycol, 1,4-butanediol, 1,3-butanediol, 1, and 2-butylene glycol etc. can be used. These dibasic acids and glycol may be used independently, respectively, and may be used as a mixture of two or more kinds.

As a used amount of these plasticizers, 1% by mass to 20% by mass to cellulose ester is desirable from the point of film performance and workability, and 3% by mass to 13% by mass is more desirable.

A UV absorber preferably can be used for a retardation film of the present invention.

As a UV absorber, a UV absorber which excels in the absorbing power of ultraviolet rays with a wavelength of 370 nm or less and has few absorption of a visible ray with a wavelength of 400 nm or more is preferably used from a viewpoint of excellent liquid crystal display property.

Examples of a UV absorbing agent preferably used in the present invention include: an oxybenzophenone based compound, a benzotriazol based compound, a salicylic acid ester based compound, a benzophenone based compound, a cyanoacrylate based compound, a triazine based compound and a nickel complex salt.

Examples of benzotriazol based UV absorbing agent will be given below, however, the present invention is not limited thereto.

UV-1: 2-(2'-hydroxy-5'-methylphenyl) benzotriazole

UV-2: 2-(2'-hydroxy-3',5'-di-tert-butylphenyl)benzotriazole

UV-3: 2-(2'-hydroxy-3'-tert-butyl-5'-methylphenyl)benzotriazole

UV-4: 2-(2'-hydroxy-3',5'-di-tert-butylphenyl)-5-chlorobenzotriazole

UV-5: 2-(2'-hydroxy-3'-(3",4",5",6"-tetrahydro phthalimidomethyl)-5'-methylphenyl)benzotriazole UV-6: 2,2-methylenebis(4-(1,1,3,3-tetramethylbutyl)-6-(2H-benzotriazole-2-yl)phenol)

UV-7: 2-(2'-hydroxy-3'-tert-butyl-5'-methylphenyl)-5-chlorobenzotriazole

UV-8: 2-(2H-benzotriazole-2-yl)-6-(n- and iso-dodecyl)-4-methylphenol (TINUVIN171, product of Ciba Specialty Chemicals Inc.)

UV-9: Mixture of octyl-3-[3-tert-butyl-4-hydroxy-5-(chloro-2H-benzotriazole-2-yl) phenyl]propionate and 2-ethylhexyl-3-[3-tert-butyl-4-hydroxy-5-(5-chloro-2H-benzotriazole-2-yl) phenyl]propionate (TINUVIN109, product of Ciba Specialty Chemicals Inc.)

Specific examples of a benzophenone based compound are shown below, however, the present invention is not limited thereto.

UV-10: 2,4-dihydroxy benzophenone

UV-11: 2,2'-dihydroxy-4-methoxybenzophenone

UV-12: 2-hydroxy-4-methoxy-5-sulfobenzophenone

UV-13: Bis(2-methoxy-4-hydroxy-5-benzoylphenylmethane)

As UV absorbing agent preferably used in the present invention, the benzotriazole or benzophenone type UV absorbing agent is preferably used which has high transparency, and minimizes deterioration of a polarizing plate or a liquid crystal. The benzotriazole type UV absorbing agent is especially preferably used, since it minimizes undesired coloration.

The UV absorbing agent disclosed in JP-A No. 2001-187825 having a distribution coefficient of 9.2 or more provide an improved surface quality of a long roll film and a favorable coating property. Preferable is a UV absorbing agent having a distribution coefficient of 1.0 or more.

A polymer UV absorbing agent (or a UV absorbing polymer) disclosed in Formula (1) or (2) in JP-A No. 6-148430 or Formula (3), (6) or (7) in JP-A No. 2000-156039 is also preferably employable. As a commercially available UV absorbing agent, PUVA-30M (produced by OTSUKA Chemical Co., Ltd.) is cited.

In order to provide a lubricating property to the cellulose ester film of the present invention, usable are the particles which will be described below to be used for a coating layer containing an ionizing radiation curable resin.

A primary average particle diameter of fine particles added to a polarizing plate protection film used for the present invention and a retardation film according to the present invention, is desirably 20 nm or less is, more preferably 5-16 nm, and still more preferably 5-12 nm. It is desirable that these fine particles are contained in a retardation film by forming secondary particles with a particle size of 0.1-5 μm, and an average particle diameter of 0.1-2 μm of them is desirable, and the average particle diameter of 0.2-0.6 μm is still more preferably. With this, unevenness (concave/convex) with a height of about 0.1-1.0 μm can be formed on a film surface, and whereby a suitable sliding property can be given to the film surface.

Measurement of the primary average particle diameter of the fine particles used for the present invention is conducted such that 100 particles are observed with a transmission type electron microscope (500,000 to 2000,000 magnification) so as to measure the diameter of the particles and to determine the mean value of the measured diameters as a primary average particle diameter.

An apparent specific gravity of the fine particles is desirably 70 g/liter, more preferably 90-200 g/liter, and still more preferably 100-200 g/liter. When the apparent specific gravity is larger, it may become more possible to make a high-concentration dispersion liquid and it may become preferable that a haze and a coagulum may be improved. Further, in case that a dope solution having a high solid concentration is prepared as being like the present invention, it is used especially preferably.

Silicon dioxide fine particles having a mean diameter of primary particles of 20 nm or less and an apparent specific gravity of 70 g/liter or more can be obtained such that, for example, a mixture of vaporized silicon tetrachloride and hydrogen is burn in air at 1000-1200° C. Moreover, since it is marketed, for example, with the product name of Aerosil 200V, and Aerosil R972V (manufactured by Japanese Aerosil Co. Ltd,), these can be used for it.

The apparent specific gravity of the above-mentioned description can be calculated with the following formula when silicon dioxide fine particles are taken a fixed quantity in a measuring cylinder and the weight of them is measured at this time:

Apparent specific gravity (g/liter)=the weight (g) of silicon dioxide fine particles/the volume (liter) of silicon dioxide fine particles The following three kinds of methods, for example, may be employed as a method of preparing a dispersion solution of fine particles usable in the present invention.

<<Preparing Method A>>

After carrying out stirring mixing a solvent and fine particles, the mixture is dispersed by a homogenizer. The resultant dispersion solution is made as a fine particle dispersion liquid. The fine particle dispersion liquid is added in a dope solution and is stirred.

<<Preparing Method B>>

After carrying out stirring mixing a solvent and fine particles, the mixture is dispersed by a homogenizer. The resultant dispersion solution is made as a fine particle dispersion liquid. Separately, a small amount of cellulose triacetate is added in a solvent and dissolved by stirring. The resultant solution is added with the fine particle dispersion liquid and is stirred. The resultant liquid is made as a fine particle additive liquid. The fine particle additive liquid is added in a dope solution and is stirred with a line mixer.

<<Preparing Method C>>

A small amount of cellulose triacetate is added in a solvent and dissolved by stirring. The resultant solution is added with fine particle and is dispersed by a homogenizer. The resultant liquid is made as a fine particle additive liquid. The fine particle additive liquid is added in a dope solution and is stirred with a line mixer.

Preparing method A is excellent in dispersion ability for the silicon dioxide fine particles, and Preparing method C is excellent in that the silicon dioxide fine particles hardly recoagulates. Among them, Preparing method B described above is excellent in both the point of the dispersion ability for the silicon dioxide fine particles and the point that the silicon dioxide fine particles hardly recoagulates, therefore, is more preferable.

<<Dispersing Method>>

When mixing silicon dioxide fine particles with a solvent etc., the concentration of the silicon dioxide is desirably 5% by mass to 30% by mass, more desirably 10% by mass to 25% by mass, most desirably 15% by mass to 20% by mass. When the dispersion concentration is higher, liquid turbidity to added amount tends to become low and a haze and a coagulum may be improved, therefore it may be preferable.

As a lower alcohol as the solvent used, methyl alcohol, ethyl alcohol, propyl alcohol, isopropyl alcohol, butyl alcohol, etc. may preferably be listed. Although a solvent other than the lower alcohol is not limited especially, it is desirable to use a solvent which is used at the time of a film production of cellulose ester.

The added amount of silicon dioxide fine particles to a cellulose ester is desirably 0.01 to 5.0 parts by mass of silicon dioxide fine particles to 100 pars by mass of cellulose ester, is more desirably 0.05 to 1.0 parts by mass, and is most desirably 0.1 to 0.5 parts by mass.

When the added amount is larger, it may be excellent in a dynamic friction coefficient, and when the added amount is smaller, a coagulum becomes little.

As a homogenizer, a usual homogenizer can be used. The homogenizer is roughly divided into a media homogenizer and a medialess homogenizer. As a homogenization for silicon dioxide fine particles, the medialess homogenizer is desirable, because of low haze. As the media homogenizer, a ball mill, a sandmill, a dieno mill, etc. are may be listed. Although a supersonic wave type, a centrifugal type, a high-pressure type, etc. may be employed as the medialess homogenizer, a high-pressure homogenization apparatus is desirable in the present invention. The high-pressure homogenization apparatus is an apparatus to create a special condition such as a high shearing and a high-pressure state by making a composition mixed of fine particles and a solvent to pass at a high speed through a small tube. When processing with the high-pressure homogenization apparatus, it is desirable that the maximum pressure condition in a small tube having a pipe diameter of 1-2000 μm in the apparatus is 9.807 MPa or more, more preferably 19.613 MPa or more. At this time, an apparatus in which the highest arrival velocity reaches 100 m/sec. or more, or an apparatus in which a rate of heat transfer reaches more than 420 kJ/hour is desirable.

Example of the high pressure dispersing apparatus includes an ultra high speed homogenizer (commercial name: Microfluidizer) manufactured by Microfluidics Corporation and Nanomizer manufactured by Nanomizer Nanomizer Co., Ltd. Other than the above, Manton-Goulin type high pressure dispersing apparatus such as a homogenizer manufactured by Izumi Food Machinery Co., Ltd is applicable.

Further, casting a dope solution containing fine particles directly onto a casting support is preferable, because a film whose sliding property become high and haze is low can be obtained.

Moreover, after casting, the film is peeled off, dried and wound up in a roll form, thereafter, the film is provided with a functional thin layer such as a hard coat layer and a reflection prevention layer. Until the film is processed or shipped, the film is usually subjected to a packaging processing in order to protect the film as a manufactured product from dirt, trash adhesion by static electricity. About this wrapping material, it will not be limited especially to a specific one if the above-mentioned purpose can be achieved, but what does not prevent volatilization of a residual solvent from the film is desirable. Concretely, polyethylene, polyester, polypropylene, nylon, polystyrene, paper, various nonwoven fabrics, etc. are may be listed. A wrapping material in which fiber became in a fomr of mesh cloth is used more preferably.

(Production Method of a Retardation Film of the Present Invention and a Polarizing Plate Protective Film Used for the Present Invention)

Next, a production method of a retardation film of the present invention and a polarizing plate protective film used for the present invention is explained to details.

The production method of a retardation film of the present invention and a polarizing plate protective film used for the present invention is conducted by a preparing process to dissolve cellulose ester and addition agents, such as the above-mentioned plasticizer in a solvent and to prepare a dope solution, a casting process to cast the dope solution on a metal base support in a shape of a drive belt or a drum, a drying process to dry the cast dope solution as a web, a peeling process to peel a film from the metal base support, a stretching process to stretch, a drying process to dry further, a heat treating process to heat-treats the obtained film further, and a winding process to wind up after cooling. A retardation film of the present invention preferably contains 70-95% by mass of cellulose ester in a solid content.

In the dope preparing step, a higher content of cellulose ester in the dope is preferable since duration of the drying step following the flow-casting step is shortened, however, a too high content may result in loss of filtration accuracy. Preferable content of cellulose ester is from 10 to 35 percent by weight and more preferably from 15 to 25 percent.

A solvent may be used alone, however, two or more solvents may also be used together. A mixture of a good solvent and a poor solvent is more preferably used to increase manufacturing efficiency. A mixed solvent being rich in a good solvent is preferable to increase solubility of the cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester even. Sometimes, a solvent works as a good solvent of a cellulose ester, and sometimes as a poor solvent depending on the average acetification degree (degree of acetyl substitution) of the cellulose ester. For example, acetone is a good solvent for an acetic ester of a cellulose ester of which the acetification degree is 2.4, as well as for an acetatepropionate of a cellulose ester, however, it is a poor solvent for an acetic ester of a cellulose of which the acetification degree is 2.8.

Good solvents used in the present invention include, for example: organic halides (such as methylene chloride), dioxolanes, acetone, methyl acetate and methyl acetoacetate, of which methylene chloride and methyl acetate are specifically preferable.

Poor solvents used in the present invention include, for example: methanol, ethanol, n-butanol, cyclohexane and cyclohexanone, however, the present invention is not specifically limited thereto. A dope may preferably contain from 0.01 to 0.2 percent by weight of water.

In the step of preparing a dope, a cellulose ester is dissolved in a mixture of solvents using a common method. Dissolving a cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure. The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high. The dissolving temperature is preferably from 45 to 120° C., more preferably from 60 to 110° C. and still more preferably from 70 to 105° C. The pressure should be controlled not to allow boiling at the set temperature.

A low temperature dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily cause clogging up of the filter. The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such as polypropylene and Teflon(R)) as well as metal(alloy) filters (such as stainless steel) are preferable, since these materials are free from peeling of a fiber, which may occur when fibrous material is used. Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per $cm^2$, more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably less than 1.6 MPa, more preferably less than 1.2 MPa and still more preferably less than 1.0 MPa.

Flow-casting of a dope will be explained below:

A metal support polished to a mirror finished surface is used in the flow-casting step. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is preferably from 0 to 40° C. and more preferably from 5 to 30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, the air temperature should be higher than the desired temperature of the support.

In order to obtain a cellulose ester film with a sufficient flatness, the content of residual solvent in the web when it is peeled from a metal support is preferably from 10 to 150 percent by weight, more preferably from 20 to 40 or from 60 to 130 percent by weight, and specifically more preferably from 20 to 30 or from 60 to 130 percent by weight.

The residual solvent content of the web is defined by the following formula:

$$\text{Residual solvent content (\% by weight)} = \{(M-N)/N\} \times 100$$

Where M represents weight of a sample of the web collected in the manufacturing step or after manufacturing, and N represents weight of the same sample after it was dried at 115° C. for 1 hour.

In the drying step of a cellulose ester film, the film is peeled from a support and further dried. The content of residual solvent in the resulting film is preferably less than 0.5 percent.

In a drying process of a film, two methods may be employed, i.e., a roll drying method (in which a cellulose ester film is passed through many rollers placed alternatively up and down in a staggered manner), and a tenter method in which a cellulose ester film is transported while both sides of the film are clipped to put tension in the lateral direction.

In case of peeling it from a casting support, it is possible to stretch in a longitudinal direction with a peeling tension and a subsequent conveyance power. For example, it is preferable to peel off with a peeling tension of 210 N/m or more, more preferably 220-300 N/m.

The retardation film of the present invention is characterized in that the in-plane retardation Ro at a wavelength of 590 nm expressed by the following equation is 30 nm through 300 nm, retardation Rt along the thickness is 80 nm through 400 nm, the film thickness is 10 μm through 70 μm, and the difference of refractive indexes on two surfaces of the film is $5 \times 10^{-4}$ or more without exceeding $5 \times 10^{-3}$. Accordingly, it is preferred to take the steps of bending the aforementioned retardation film at the atmosphere temperature of glass transition point ±30° C. so that the one of the film surfaces will be bent inward; and then bending the aforementioned retardation film so that the other surface will be bent inward; wherein the aforementioned steps are repeated 150 or more through 1000 times exclusive, until the value for 1/a is in the range form 0.013 through 0.033 (mm$^{-1}$) when the radium of the bent film is assumed as "a" (mm).

Figure 1:
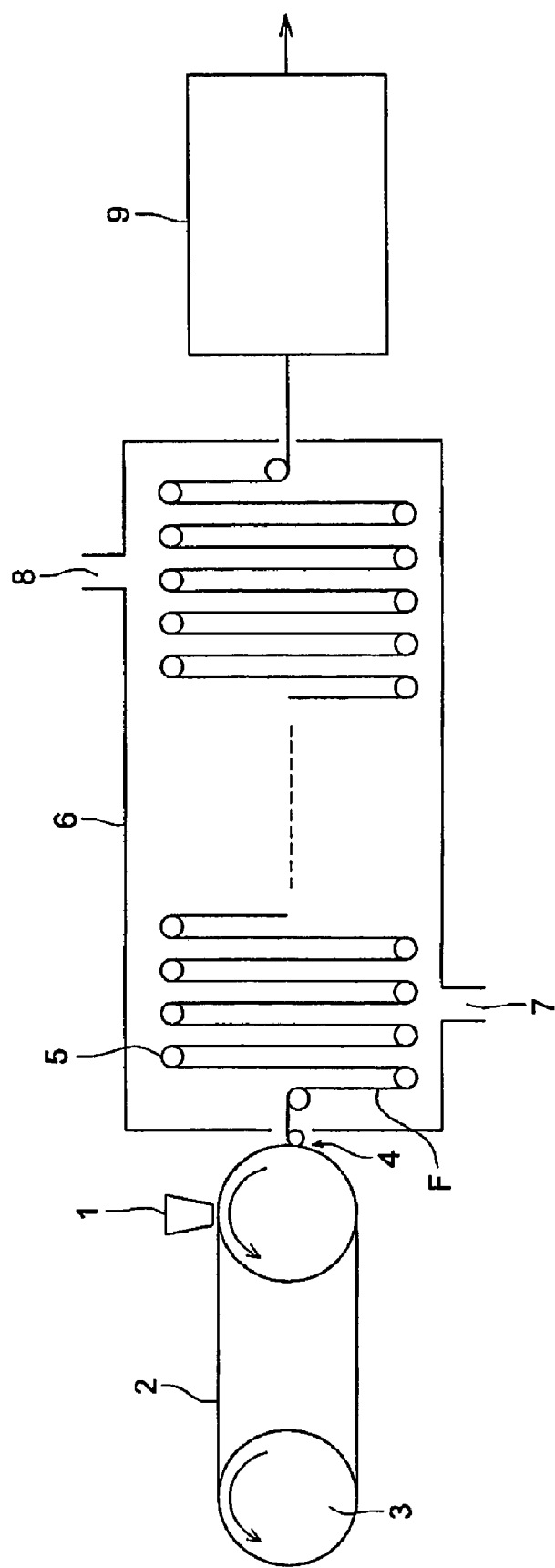
FIG. 1 is a schematic diagram representing a bending apparatus preferably used in the present invention.

The following describes the aforementioned bending procedure with reference to drawings:

FIG. 1 is a schematic diagram representing the bending apparatus preferable to the present invention.

The dope solution flows from the die 1 over to a metallic support 2, and the film is dried on the metallic support by a drive roll 3 on a continuous basis to form a web (a doped membrane flowing over to the metallic support). The web is dried so that the amount of residual solvent will reach a desired level, and is separated in the form of a film at a separation point 4. The web is conveyed by multiple conveyance rolls 5 so that the surface A (the surface opposite to where the web is in contact with the metallic support) and the surface B (the surface where the web is in contact with the metallic support) will be located alternately inside the conveyance rolls 5. Then the bending operation is repeated on a continuous basis. This bending operation is carried out inside a bending zone 6 including an air inlet 7 and an air outlet 8. Adjustment is made to ensure that the film will be bent at a desired atmospheric temperature.

The conveyance roll preferably has a diameter of 90 through 108 mm. The distance between rolls is preferably about 1800 mm. The roll diameter should be determined so that the value for 1/a will be 0.013 through 0.033 (mm$^{-1}$) when the radius of the film having been bent is a (mm). The roll diameter is preferably 0.013 through 0.033, more preferably 0.017 through 0.025, still more preferably 0.019 through 0.022.

In the bending zone 6, the hot air with its temperature properly adjusted is led from the air inlet 7 to maintain the constant atmospheric temperature inside the bending zone 6. The air is exhausted from the air outlet 8. To adjust the atmospheric temperature inside the bending zone 6, infrared rays and heating rolls may be used. For the advantage of simplicity and convenience, hot air is preferably used. Further, air may be used as the atmosphere inside the drying apparatus. Inert gas such as nitrogen gas, carbon dioxide gas and argon can also be used.

The atmospheric temperature when bending the retardation film of the present invention is preferably the glass transition temperature of the cellulose ester film ±30° C. for the purpose of ensuring the advantages of the present invention. If the atmospheric temperature is less than glass transition temperature −30° C. or over glass transition temperature +30° C., it will be difficult to ensure a desired difference of refractive indexes with good reproducibility. More preferred atmospheric temperature is within the range of the glass transition temperature of the cellulose ester film ±20° C.

The number of times the retardation film of the present invention is bent is preferably 150 or more through 1000, more preferably 250 or more, still more preferably 350 or more. The film is preferably bent at an interval of 1 second through 1 minute, more preferably at an interval of 2 through 30 seconds.

The retardation film is preferably conveyed at a speed of 10 m through 150 m/min., more preferably at a speed of 15 m through 100 m/min., when productivity and breakage are taken into account.

The aforementioned processing ensures that the difference of refractive indexes between two surfaces of the retardation film of the present invention is $5 \times 10^{-4}$ or more without exceeding $5 \times 10^{-3}$.

<Measurement of Refractive Indexes on the Front and Rear>

The present inventors kept the film sample at an environment of 23° C. and 55% RH for 24 hours. Using an Abbe refractometer (1T) and spectral light source, they measured the average refractive index on the front and rear of the retardation film at a wavelength of 590 nm at the same environment. The surface of the film in the sense in which it is used here refers to the surface (surface A) opposite to the aforementioned metallic support when dope is flow-cast. The rear of the film refers to the surface (surface B) of the aforementioned metallic support when dope is flow-cast.

Bending can be applied to any one of the retardation film manufacturing processes. It is preferably applied before the tenter process subsequent to removal of the film from the metallic support.

Figure 2:
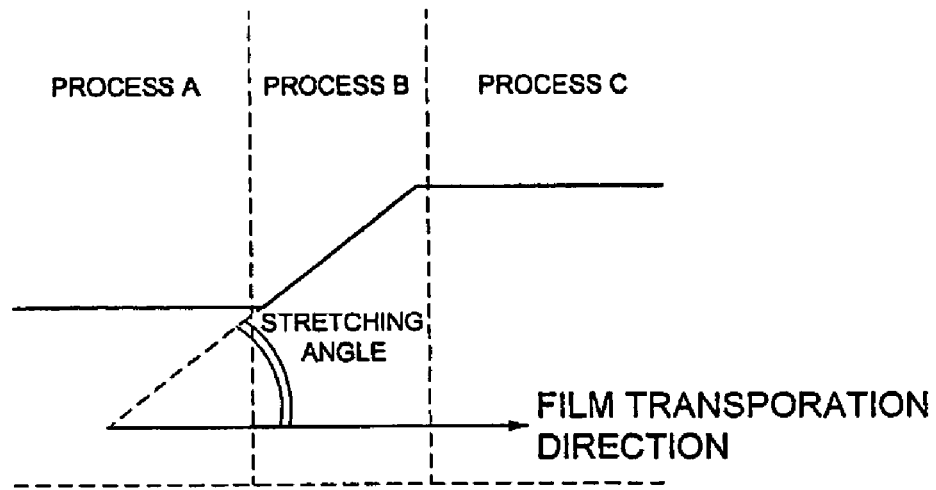
FIG. 2 is an explanatory schematic diagram representing the draw angle in the drawing process.
Figure 3:
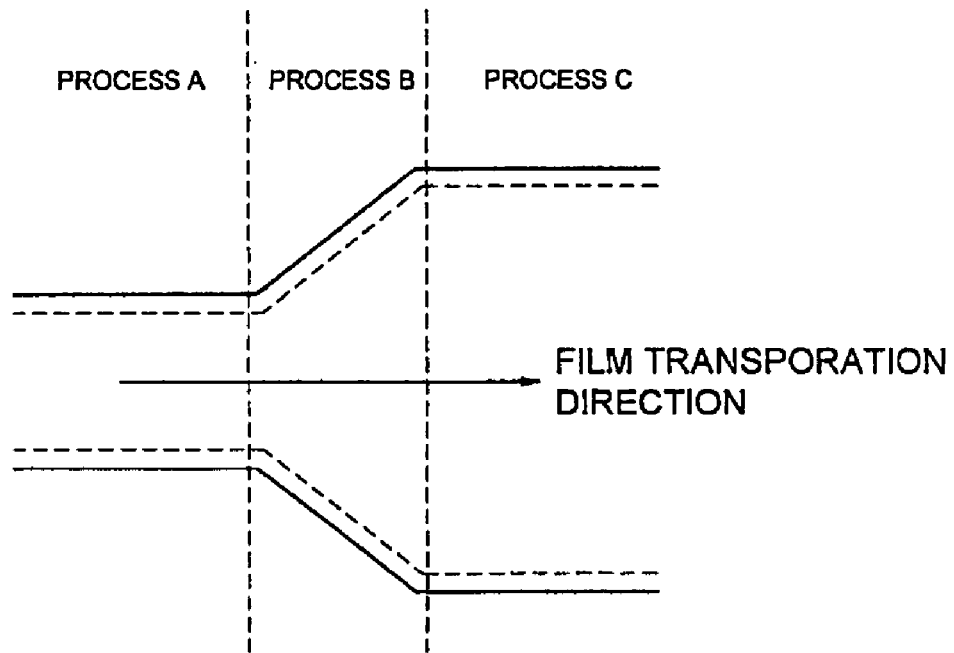
FIG. 3 is a schematic diagram representing an example of the tender process used in the present invention.

The following describes an example of the drawing process (also called the tenter process) for manufacturing the retardation film of the present invention with reference to FIG. 3:

In FIG. 3, the process A is a process for clamping the web having been conveyed from a web conveyance process DO (not illustrated). In the next process B, the web is drawn crosswise (in the direction perpendicular to the web traveling direction) at a draw angle shown in FIG. 2. In the process C, drawing terminates and the web being clamped is conveyed.

A slitter is preferably arranged to cut off the end of the web across the width before start of the process B subsequent to removal of the web from the flow-cast support, and/or immediately after process C. It is especially preferred to provide a slitter to cut off the end of the web immediately before the start of the process A. The same process of drawing is performed across the width, and comparison is made between the case where the end of the web is cut off before the start of the process B and the case where the end of the web is not cut off. This comparison shows that the distribution of the draw angle is improved more effectively in the former case. The draw angle can be defined as the smaller angle of the following two angles—the angle formed by the direction wherein the in-plane refractive index is maximized and the direction of film conveyance, and the angle formed by the direction wherein the in-plane refractive index is maximized and the direction perpendicular to the direction of film conveyance in the film surface. The draw angle is measured at an interval of 3 through 10 cm across the width of the film, and all the draw angles are preferably within ±1.5°, more preferably within ±1.0°. The aforementioned advantages are considered to be the result of suppressing the unintended drawing in the longitudinal direction from the point of separation to the crosswise drawing process B wherein the amount of residual solvent is greater.

In the tenter process, it is preferred to intentionally create zones having different temperatures in order to improve the distribution of the draw angle. Further, a neutral zone is preferably arranged between the zones having different temperatures to ensure that there will be no interference between these zones.

The drawing operation can be separated into several steps. Biaxial drawing is preferably performed in the flow-casting direction and in the crosswise direction. Further, if biaxial drawing is to be performed, it can be performed simultaneously in one operation or stepwise in several steps. In the case of "stepwise" operation, drawing operations in different directions can be performed sequentially, for example. Alternatively, the drawing operation in one direction can be divided into several steps, and the drawing operation in different directions can be included in any one of these steps.

To ensure the advantages of the present invention effectively, it is particularly preferred to perform crosswise drawing in the tenter method wherein the web having been separated from the metallic support is conveyed while being bent, and both ends of the web is clamped by a pin or clip. This procedure provides the advantages of the present invention; namely, the curl of the retardation film is adjusted, and a predetermined retardation is assigned to the retardation film. In this case, drawing can be performed only in the crosswise direction, or biaxial drawing can preferably be performed simultaneously in one operation. The drawing magnification is preferably 1.05 through 2, more preferably 1.15 through 1.5. When biaxial drawing is performed simultaneously in one operation, the web can contract in the longitudinal direction. Alternatively, it can be shrunken to a magnification of 0.8 through 0.99, preferably 0.9 through 0.99. The area is increased preferably 1.12 through 1.44 times, more preferably 1.15 through 1.32 times by crosswise drawing and longitudinal expansion and contraction. This is obtained from the drawing magnification in the longitudinal direction multiplied by crosswise drawing magnification.

The term "stretching direction" is usually used to indicate the direction in which a direct stretching stress is applied to a film, however, in a case of stepped biaxial stretching, "stretching direction" may indicate the direction in which the final stretching factor is the largest, which is usually identical to the direction of a slow axis.

It is well known that, when a film is stretched in the transverse direction of the film, the dispersion of orientations of slow axes (hereafter referred to as a orientation angle dispersion) becomes larger. In order to conduct stretching in the transverse direction of a film while the ratio of Rth to Ro is kept constant and the orientation angle dispersion is kept small, a film preferably satisfies Ta≦(Tb−10), or Tc≦Tb, and more preferably the film satisfies both Ta≦(Tb−10) and Tc≦Tb, wherein Ta, Tb and Tc each represents a temperatures in Celsius at each end of Processes A, B and C, respectively.

In order to decrease the above mentioned orientation angle dispersion, the temperature increasing rate of the film in Process B is preferably 0.5 to 10° C./s.

The stretching duration in Process B is preferably shorter to increase a dimensional stability in the 80° C.-90% RH test, however, a lower limitation of the stretching duration may be prescribed to maintain uniformity of the film. The stretching duration is preferably 1 to 10 seconds, more preferably 4 to 10 seconds. The temperature in Process B is preferably 40 to 180° C., more preferably 100 to 160° C.

In the tenter process, a coefficient of heat transfer may be constant or may be changed. The heat transfer coefficient is preferably in the range of $41.9 \times 10^3$ to $419 \times 10^3$ J/m²hr, more preferably $41.9 \times 10^3$ to $209.5 \times 10^3$ J/m²hr, and further more preferably $41.9 \times 10^3$ to $126 \times 10^3$ J/m²hr.

The stretching rate in the transverse direction in Process B may be constant or may be changed. The stretching rate is preferably in the range of 50 to 500%/minute, more preferably 100 to 400%/minute, and most preferably 200 to 300%/minute.

In the tenter process, the distribution of environmental temperature is preferably smaller to improve uniformity of a film. The distribution of environmental temperature in the tenter process is preferably within ±5° C., more preferably within ±2° C., and most preferably within ±1° C. By decreasing the distribution of environmental temperature, the temperature distribution in the transverse direction of a film may also be decreased.

In Process C, in order to suppress further stretching, the width of a film held by a tenter is preferably reduced. Specifically, the width is preferably reduced to 95 to 99.5% of the former process.

After a film is treated in the tenter process, a subsequent-drying process (hereafter referred to as Process D1) is preferably provided. In order to refine the optical property provided to the film in the tenter process and to further dry the film, the film is preferably subjected to a heat treatment in the temperature range of 50 to 140° C., more preferably, 80 to 140° C., and most preferably 110 to 130° C.

In Process D1, the distribution of environmental temperature in the transverse direction on a film is preferably smaller to improve uniformity of a film. The distribution of environmental temperature in the transverse direction is preferably within ±5° C., more preferably within ±2° C., and most preferably within ±1° C.

Although the film tension while the film is being conveyed is affected by several factors, for example: the property of a dope, the amount of residual solvent at the peeling process and Process DO, and the temperature of Process D1, the film tension is preferably 120 to 200 N/m, more preferably 140 to 200 N/M, and most preferably 140 to 160 N/m.

In order to reduce further stretching in the machine direction of the film in Process D1, a tension cut roll is preferably provided.

A device to dry a web does not have a restriction specifically, and although it can generally carry out with a hot wind, infrared radiation, a heating roll, a microwave, etc., it is desirable to carry out by a hot wind in respect of simplicity.

As for the drying temperature in the drying process for a web, it is desirable to make it high gradually at 30-160° C.

Moreover, as for a retardation film of the present invention, it is desirable that the free volume radius obtained by a positron annihilation lifetime spectroscopy is 0.250-0.350 nm, more preferably 0.250-0.310 nm.

The free volume in the present invention represents vacant area which is not occupied by the cellulose ester chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons.

(Measurement of Free Volume Radius by Positron Annihilation Lifetime Spectroscopy, and Free Volume Parameter)

A positron annihilation lifetime and relative intensity were measured under the following measurement condition.

(Measurement Condition)
Positron source: 22NaCl (intensity: 1.85 MBq)
Gamma-ray detector: Plastic scintillator+Photomultiplier tube
Apparatus time resolution: 290 ps
Measurement temperature: 23° C.
Total number of counts: 1 million counts
Specimen size: 20 mm×15 mm×2 mm
20 pieces of 20 mm×15 mm sized films were piled to prepare an about 2 mm thick sample. The sample was dried under vacuum 24 hours.
Irradiation area: A circle of about 10 mm in diameter
Time per channel: 23.3 ps/ch According to the above measurement condition, positron annihilation lifetime spectroscopy was carried out. A three component analysis using a nonlinear least-square method was carried out for the obtained results. When the annihilation times were referred to as, in small order, $\tau 1$, $\tau 2$ and $\tau 3$ and the corresponding intensities were referred to as I1, I2 and I3 (I1+I2+I3=100%), respectively, using the largest annihilation time $\tau 3$, a free volume radius R3 (nm) was determined using the following formula. The larger the $\tau 3$ value is, the larger the estimated free volume is.

$$\tau 3 = (1/2)[1-\{R3/(R3+0.166)\}+(1/2\pi)\sin\{2\pi R3/(R3+0.166)\}]^{-1}$$

where, 0.166 (nm) represents the thickness of the electronic layer which is exuding from the wall of a hole.

The above measurements were repeated twice and the mean values were calculated for the determination.

Evaluation of a free volume in polymer by positron annihilation spectroscopy is explained in, for example, MATERIAL STAGE vol.4, No.5, 2004, pp. 21-25, The TRC News, No. 80 (July, 2002) PP. 20-22 (published by Toray Research Center), and "BUNSEKI (Analysis)", 1988, pp. 11-20".

The free volume radius of the retardation film of the present invention is preferably 0.250-0.310 nm and is more preferably 0.270-0.305 nm.

The method of controlling the free volume radius of the retardation film containing a low volatile plasticizer and cellulose derivative in a prescribed range is not specifically limited, however, the following method may be applicable.

A retardation film having a free volume radius of 0.250-0.310 nm and a free volume parameter of 1.0-2.0, both of which are determined by positron annihilation lifetime spectroscopy may be obtained, for example, by the following method: casting a dope containing a polyalcohol ester, a polycarboxylic acid ester, and a cellulose ester to form a web; stretching the web while the web contains residual solvent; drying the web until the amount of residual solvent decreases to 0.3% to obtain a cellulose ester film; (iv) heat treating the cellulose ester film at 105 -155° C. in a film transportation process under a circumstance in which the rate of atmosphere replacement of not less than 12 times/h, or more preferably 12-45 times/h.

The rate of atmosphere replacement is the number of times replacing the atmosphere of a heat treatment chamber by fresh-air per unit time, provided that the volume of the heat treatment chamber is expressed as V (m$^3$) and the amount of fresh-air sent to the heat treatment chamber is expressed as FA (m$^3$/h). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=$FA/V$(times/$h$)

Furthermore, in order to produce a retardation film or a polarizing plate protective film of the present invention, it is desirable to give a pressure of 0.5 kPa or more to 10 kPa or less in a thickness direction onto the film in the heat treatment process after the drying process, for example, it is desirable to apply a pressure uniformly with a nip roll. In case of applying a pressure in the thickness direction, it is desirable that drying is fully completed. Further, at this time, the free volume radius of a retardation film can be controlled by applying a pressure of 0.5 kPa or more to 10 kPa or less from both surfaces of the film. Concretely, a method of applying a pressure on a film with two parallel nip rolls may be employed. Moreover, a method like a calender roll may be employed. At the time of pressing, a temperature is desirably 105-155° C.

After the prescribed heat treatment, it is desirable to cut off end portions with a slitter before rolling up in order to obtain an excellent roll formation. Furthermore, it is desirable to carry out a knurling processing onto both ends of width.

The knurling processing can be formed by pressing a heated emboss roll. Since fine unevenness (concave/convex) are formed on the emboss roll, fine unevenness (concave/convex) can be formed on a film by pressing the emboss roll on the film so as to make end portions higher.

The knurling of both ends of width of a retardation film of the present invention and a polarizing plate protective film used for the present invention preferably has a height of 4-20 μm and a width of 5-20 mm.

Moreover, in the present invention, it may be preferable to provide the above-mentioned knurling processing before a winding up process after a drying process in a film-production process.

A center line average roughness (Ra) of the surface of a retardation film according to the present invention preferably is of 0.001-1 micrometer (μm).

An in-plane retardation Ro, defined by the following formula, of a retardation film according to the present invention is preferably 30-300 nm, more preferably 50-100 nm.

A thickness direction retardation Rt is 80-400 nm, more preferably 100-300 nm.

Retardation values of Ro and Rt or an angle $\theta_0$ (°) formed by a width direction of a retardation film and a slow axis can be measured by a an automatic birefringence meter. Refractive indexes nx, ny, nz are obtained by measuring birefringence of a cellulose ester film at 590 nm under an environment of 23° C. and 55% RH by employing an automatic birefringence meter KOBRA-21ADH (produced by Oji Scientific Instruments Co., Ltd.), and Ro and Rt are calculated in accordance with the following formulas.

$$Ro=(nx-ny)\times d \quad \text{Formula (i)}$$

$$Rt=\{(nx+ny)/2-nz\}\times d \quad \text{Formula (ii)}$$

(In the formulas, nx represents a refractive index in a slow axis direction in the film plane, ny represents a refractive index direction in a fast axis in the film plane, nz represents a refractive index of the film in the thickness direction, and d (in nm) represents the film thickness.)

On the other hand, the retardation Ro of a polarizing plate protective film used for the present invention is desirably 20 nm or less, and the retardation Rt is desirably 50 nm or less.

The thickness of a retardation film according to the present invention is 10-70 μm.

Generally, although the thicker one in the layer thickness of a retardation film tends to enlarge a retardation, a polarizing plate protection film is provided with a retardation function and a retardation film of a thin film is used in the present invention. Whereby the thickness of the entire polarizing plate is reduced, an influence caused by a drying process at the time of producing the polarizing plate and an influence with the passage of time while storing can be reduced, and a distortion of a polarizing plate can be reduced greatly. The more desirable value of the thickness is in the range of 20-60 μm.

Although there is no restriction in particular in the thickness of a polarizing plate protective film used for the present invention, since the range of the thickness of the polarizing plate of the present invention is 70-140 μm or less, it is naturally desirable that it is a thin film. More preferably, it is in the range of 20-60 μm as being like a retardation film.

A water-vapor permeability as a value measured according to JIS Z 0208 (25° C., 90% RH) is desirably 200 g/m²·24 hours or less, more desirably 10 to 180 g/m²·24 hours, still more desirably 160 g/m²·24 hours or less. Especially, it is desirable that the water-vapor permeability is in the above range with the thickness of 20 μm to 60 μm.

Concretely, a retardation film of the present invention and a polarizing plate protective film used for the present invention has a length of about 100 m-5000 m, and is usually in a configuration provided in a shape of a roll. Moreover, the width of a retardation film of the present invention is desirably 1 m or more, more desirably 1.4 m or more, still more preferably 1.4 to 4 m.

Polarizing plate protective film A of the present invention is a film provided on the viewer side, and preferably has a functional layer described below at least on one surface of the film.

(Hard Coat Layer)

In the present invention, a hard coat layer can be provided on polarizing plate protective film a functional layer.

The hard coat layer of the present invention is provided at least on one surface of polarizing plate protective film A. Polarizing plate protective film A of the present invention preferably has an antireflection layer (for example, a high refractive index layer and a low refractive index layer) to form an antireflection film.

An actinic ray curable resin layer is preferably employed as a hard coat layer.

The actinic ray curable resin layer refers to a layer which contains, as a main component, a resin cured through a crosslinking reaction when exposed to actinic rays such as UV light or electron beams. The actinic ray curable resin layer preferably contains an ethylenically unsaturated monomer, which is exposed to actinic rays such as UV light or electron beams and cured to form a hard coat layer. Listed as representative actinic ray curable resins are UV curable resins as well as electron beam curable resins. The actinic ray curable resin is preferably a UV curable resin.

Listed as UV curable resins may be, for example, UV curable urethane acrylate resins, UV curable polyester acrylate resins, UV curable epoxy acrylate resins, UV curable polyol acrylate resins, or UV curable epoxy resins.

The UV curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The UV ray curable polyesteracrylate resins include those prepared easily by reacting a polyesterpolyol with 2-hydroxyethylacrylate or 2-hydroxypropylacrylate, disclosed for example, in Japanese Patent O.P.I. Publication No. 59-151112.

Examples of the UV ray curable epoxyacrylate resin include those prepared by reacting an epoxyacrylate oligomer in the presence of a reactive diluting agent and a photoinitiator, disclosed for example, in Japanese Patent O.P.I. Publication No. 1-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV ray curable resins include benzoine or its derivative, or acetophenones, benzophenones, hydroxy benzophenones, Michler's ketone, α-amyloxime esters, thioxanthones or their derivatives. an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the UV ray curable resin layer is 0.1 to 15 parts by weight, and preferably 1 to 10 parts by weight, based on the 100 parts by weight of the UV ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP =30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No.340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetracrylate, pentaerythritol triacrylate, pentaerythritol tetracrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. An air cooling or a water cooling light source is preferably used. The preferable irradiation quantity of light may be changed depending on the type of lamp, however, it is preferably from 5 to 150 mJ/cm$^2$, and more preferably from 20 to 100 mJ/cm$^2$.

The oxygen content at the irradiation area is preferably decreased to 0.01-2% by purging with nitrogen.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used: (i) a method of providing tension while the film is being transported over back rolls, and (ii) a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

In a coating solution of a UV ray-curable resin, a silicon compound such as a polyether modified silicone oil, is preferably added. The number average molecular weight of the polyether modified silicone oil is preferably from 1,000 to 100,000 and more preferably from 2,000 to 50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improvement of scratch resistance of the film as well as water-resistance, oil-resistance and anti-stain properties of the film. The content of the silicon compound is preferably from 0.01 to 3% by weight based on the solid components in the coating solution.

The aforementioned coating methods are also used as coating method of a UV ray-curable resin layer coating solution. The wet thickness of the coated UV-curable resin layer is preferably from 0.1 to 30 μm and more preferably from 0.5 to 15 μm. The dry thickness of the coated UV-curable resin layer is preferably from 0.1 to 20 μm and more preferably from 1 to 10 μm.

The UV ray-curable resin layer is preferably irradiated with UV rays during or after drying. The duration of UV ray irradiation is preferably from 0.1 seconds to 5 minutes in order to secure the exposure amount from 5 to 100 mJ/cm$^2$ as mentioned above. In view of working efficiency and hardening efficiency of the UV-curable resin layer, the duration is more preferably from 0.1 to 10 seconds.

Intensity of the actinic ray is preferably from 50 to 150 mW/cm$^2$ on the irradiated surface.

The UV-cured resin layer thus obtained may preferably contain inorganic or organic microparticles in order to attain the following characteristics: (i) preventing blocking, (ii) improving scratch resistance, (iii) providing an antiglare property and (iv) optimizing the reflective index.

The hard coat layer of the present invention preferably contains inorganic microparticles, examples of which include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic microparticles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystylene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of the microparticles is preferably from 0.005 to 5 μm and specifically preferably from 0.01 to 1 μm. The microparticle content of the hard coat layer is preferably from 0.1 to 30 weight parts per 100 weight parts of the UV-curable resin composition.

It is preferred that the UV curable resin layer is a clear hard coat layer having a center-line average roughness (Ra prescribed by JIS B 0601) of 1 to 50 nm or an anti-glare layer Having an Ra value of from 0.1 to 1 μm. The center-line average roughness (Ra) is preferably measured by means of a surface roughness meter using interference of light, for example, RST/PLUS manufactured by WYKO Co., Ltd.

The hard coat layer of the present invention may preferably contain an antistatic agent. For example, preferable are an electrically conductive material containing as a main ingredient at least one of the element selected from the group of Sn, Ti, In, Al, Zn, Si, Mg, Ba, Mo, W and V, and having a volume resistivity of not more than $10^7$ ohm·cm.

Examples of the antistatic agent also include: oxides and complex oxides of the above described elements.

Examples of a metal oxide include: $ZnO$, $TiO_2$, $SnO_2$, $Al_2O_3$, $In_2O_3$, $SiO_2$, $MgO$, $BaO$, $MoO_2$, $V_2O_5$ and complex metal oxides thereof. Of these, specifically preferable are, for example, $ZnO$, $In_2O_3$, $TiO_2$, and $SnO_2$. As examples of indroduction of foreign element, effective are, (i) introduction of, for example, Al or In in $ZnO$; (ii) introduction of, for example, Nb or Ta in $TiO_2$; and (iii) introduction of, for example, Sb, Nb or a halogen atom in $SnO_2$. The amount of the foreign element is preferably 0.01-25mol % and specifically preferably 0.1-15mol %. The volume resistivity of these conductive metal oxide powder is preferably $10^7$ ohm·cm or less and specifically preferably $10^5$ ohm·cm or less.

(Antireflection Layer)

Polarizing plate protective film A of the present invention is preferably further provided with an antireflection layer as a functional layer on the hard coat layer. The antireflection layer preferably has a low refractive index layer containing hollow particles.

The low refractive index layer of the present invention preferably contain hollow particles <Hollow Particles>

In the low refractive index layer, hollow particles described below are preferably incorporated.

The hollow particles can be classified into (1) the composite particles made of porous particle and the coated layer arranged on this porous particle surface; and (2) the hollow particles that have a hollow interior filled with solvent, gas or porous substances. The low-refractive index layer coating solution may contain (1) composite particles and/or (2) hollow particles.

Herein, hollow particles are particles the interior of which is provided with a hollow, and the hollow is surrounded by a particle wall. The interior of the hollow is filled with the contents such as a solvent, a gas or a porous substance which have been utilized in preparation. The mean particle size of such hollow particles is preferably in a range of 5-300 nm and preferably of 10-200 nm. The mean particle size of hollow particles utilized is appropriately selected depending on the thickness of the formed transparent cover film and is preferably in a range of $2/3$-$1/10$ of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, $NaF$, $NaAlF_6$ and $MgF$. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased.

Herein, the pore volume of such a porous particle can be determined by a mercury pressurized impregnation method.

Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those comprising single component or mixture of plural components.

As a manufacturing method of such hollow particles, a preparation method of complex oxide colloidal particles, disclosed in paragraph Nos. [0010]-[0033] of JP-A No. 7-133105 (JP-A refers to Japanese Patent Publication Open to Public Inspection), is suitably applied. Specifically, in the case of a complex particle being comprised of silica and an inorganic compound other than silica, the hollow particle is manufactured according to the following first-third processes.

First Process: Preparation of Porous Particle Precursor

In the first process, alkaline aqueous solutions of a silica raw material and of an inorganic compound raw material other than silica are independently prepared or a mixed aqueous solution of a silica raw material and an inorganic compound raw material other than silica is prepared, in advance, and this aqueous solution is gradually added into an alkaline aqueous solution having a pH of not less than 10 while stirring depending on the complex ratio of the aimed complex oxide, whereby a porous particle precursor is prepared.

As a silica raw material, silicate of alkali metal, ammonium or organic base is utilized. As silicate of alkali metal, utilized are sodium silicate (water glass) and potassium silicate. Organic base includes quaternary ammonium salt such as tetraethylammonium salt; and amines such as monoethanolamine, diethanolamine and triethanolamine. Herein, an alkaline solution, in which such as ammonia, quaternary ammonium hydroxide or an amine compound is added in a silicic acid solution, is also included in silicate of ammonium or silicate of organic base.

Further, as a raw material of an inorganic compound other than silica, utilized is an alkali-soluble inorganic compound.

Specific examples include oxoacid of an element selected from such as Al, B, Ti, Zr, Sn, Ce, P, Sb, Mo, Zn and W; alkali metal salt, alkaline earth metal salt, ammonium salt and quaternary ammonium salt of said oxoacid. More specifically, sodium alminate, sodium tetraborate, ammonium zirconyl carbonate, potassium antimonite, potassium stannate, sodium alminosilicate, sodium molybdate, cerium ammonium nitrate and sodium phosphate are suitable. The pH value of a mixed aqueous solution changes simultaneously with addition of these aqueous solutions, however, operation to control the pH value into a specific range is not necessary. The aqueous solution finally takes a pH value determined by the types and the mixing ratio of inorganic oxide. At this time, the addition rate of an aqueous solution is not specifically limited. Further, dispersion of a seed particle may be also utilized as a starting material at the time of manufacturing of complex oxide particles. Said seed particles are not specifically limited, however, particles of inorganic oxide such as $SiO_2$, $Al_2O_3$, $TiO_2$ or $ZrO_2$ or complex oxide thereof are utilized, and generally sol thereof can be utilized. Further, a porous particle precursor dispersion prepared by the aforesaid manufacturing method may be utilized as a seed particle dispersion. In the case of utilizing a seed particle dispersion, after the pH of a seed particle dispersion is adjusted to not lower than 10, an aqueous solution of the aforesaid compound is added into said seed particle dispersion while stirring. In this case pH control of dispersion is not necessarily required. By utilizing seed particles in this manner, it is easy to control the particle size of prepared particles and particles having a uniform size distribution can be obtained.

A silica raw material and an inorganic compound raw material, which were described above, have a high solubility at alkaline side. However, when the both are mixed in pH range showing this high solubility, the solubility of an oxoacid ion such as a silicic acid ion and an aluminic acid ion will decrease, resulting in precipitation of these complex products to form particles or to be precipitated on a seed particle causing particle growth. Therefore, at the time of precipitation and growth of particles, pH control in a conventional method is not necessarily required.

In the first process, a complex ratio of silica and an inorganic compound other than silica is preferably in a range of 0.05-2.0 and more preferably of 0.2-2.0, based on mole ratio $MO_x/SiO_2$, when an inorganic compound other than silica is converted to oxide ($MO_x$). In this range, the smaller is the ratio of silica, increases the pore volume of porous particles. However, a pore volume of porous particles barely increases even when the mole ratio is over 2.0. On the other hand, a pore volume becomes small when the mole ratio is less than 0.05. In the case of preparing hollow particles, mole ratio of $MO_x/SiO_2$ is preferably in a range of 0.25-2.0.

Second Process:

Elimination of Inorganic Compounds other than Silica from Porous Particles

In the second process, at least a part of inorganic compounds other than silica (elements other than silica and oxygen) is selectively eliminated from the porous particle precursor prepared in the aforesaid first process. As a specific elimination method, inorganic compounds in a porous particle precursor are dissolving eliminated by use of such as mineral acid and organic acid, or ion-exchanging eliminated by being contacted with cationic ion-exchange resin.

Herein, a porous particle precursor prepared in the first process is a particle having a network structure in which silica and an inorganic compound element bond via oxygen. In this manner, by eliminating inorganic compounds (elements other than silica and oxygen) from a porous particle precursor, porous particles, which are more porous and have a large pore volume, can be prepared. Further, hollow particles can be prepared by increasing the elimination amount of inorganic compound (elements other than silica and oxygen) from a porous particle precursor.

Further, in advance to elimination of inorganic compounds other than silica from a porous particle precursor, it is preferable to form a silica protective film by adding a silicic acid solution which contains a silane compound having a fluorine substituted alkyl group, and is prepared by dealkalization of alkali metal salt of silica; or a hydrolyzable organosilicon compound, in a porous particle precursor dispersion prepared in the first process. The thickness of a silica protective film is 0.5-15 nm. Herein, even when a silica protective film is formed, since the protective film in this process is porous and has a thin thickness, it is possible to eliminate the aforesaid inorganic compounds other than silica from a porous particle precursor.

By forming such a silica protective film, the aforesaid inorganic compounds other than silica can be eliminated from a porous particle precursor while keeping the particle shape as it is. Further, at the time of forming a silica cover layer described later, the pore of porous particles is not blocked by a cover layer, and thereby the silica cover layer described later can be formed without decreasing the pore volume. Herein, when the amount of inorganic compound to be eliminated is small, it is not necessary to form a protective film because the particles will never be broken.

Further, in the case of preparation of hollow particles, it is preferable to form this silica protective film. At the time of preparation of hollow particles, a hollow particle precursor, which is comprised of a silica protective film, a solvent and insoluble porous solid within said silica protective film, is obtained when inorganic compounds are eliminated, and hollow particles are formed, by making a particle wall from a formed cover layer, when the cover layer described later is formed on said hollow particle precursor.

The amount of a silica source added to form the aforesaid silica protective film is preferably in a range to maintain the particle shape. When the amount of a silica source is excessively large, it may become difficult to eliminate inorganic compounds other than silica from a porous particle precursor because a silica protective film becomes excessively thick. As a hydrolizable organosilicon compound utilized to form a silica protective film, alkoxysilane represented by formula $R_nSi(OR')_{4-n}$ [R, R': a hydrocarbon group such as an alkyl group, an aryl group, a vinyl group and an acryl group; n=0, 1, 2 or 3] can be utilized. Fluorine-substituted tetraalkoxysilane, such as tetramethoxysilane, tetraethoxysilane and tetraisopropoxysilane, is specifically preferably utilized.

As an addition method, a solution, in which a small amount of alkali or acid as a catalyst is added into a mixed solution of these alkoxysilane, pure water and alcohol, is added into the aforesaid dispersion of porous particles, and silicic acid polymer formed by hydrolysis of alkoxysilane is precipitated on the surface of inorganic oxide particles. At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of a porous particle precursor is water alone or has a high ratio of water to an organic solvent, it is also possible to form a silica protective film by use of a silicic acid solution. In the case of utilizing a silicic acid solution, a predetermined amount of a silicic acid solution is added into the dispersion and alkali is added simultaneously, to precipitate silicic acid solution on the porous particle surface. Herein, a silica protective film may also be formed by utilizing a silicic acid solution and the aforesaid alkoxysilane in combination.

Third Process: Formation of Silica Cover Layer

In the third process, by addition of such as a hydrolyzable organosilicon compound containing a silane compound provided with a fluorine substituted alkyl group, or a silicic acid solution, into a porous particle dispersion (into a hollow particle dispersion in the case of hollow particles), which is prepared in the second process, the surface of particles is covered with a polymer substance of such as a hydrolyzable organosilicon compound or a silicic acid solution to form a silica cover layer.

As a hydrolyzable organosilicon compound utilized for formation of a silica cover layer, alkoxysilane represented by formula $R_nSi(OR')_{4-n}$ [R, R': a hydrocarbon group such as an alkyl group, an aryl group, a vinyl group and an acryl group; n=0, 1, 2 or 3], as described before, can be utilized. Tetraalkoxysilane such as tetramethoxysilane, tetraethoxysilane and tetraisopropoxysilane are specifically preferably utilized.

As an addition method, a solution, in which a small amount of alkali or acid as a catalyst is added into a mixed solution of these alkoxysilane, pure water and alcohol, is added into the aforesaid dispersion of porous particles (a hollow particle precursor in the case of hollow particles), and silicic acid polymer formed by hydrolysis of alkoxysilane is precipitated on the surface of porous particles (a hollow particle precursor in the case of hollow particles). At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of porous particles (a hollow particle precursor in the case of hollow particles) is water alone or a mixed solution of water with an organic solvent having a high ratio of water to an organic solvent, it is also possible to form a cover layer by use of a silicic acid solution. A silicic acid solution is an aqueous solution of lower polymer of silicic acid which is formed by ion-exchange and dealkalization of an aqueous solution of alkali metal silicate such as water glass.

A silicic acid solution is added into a dispersion of porous particles (a hollow particle precursor in the case of hollow particles), and alkali is simultaneously added to precipitate silicic acid lower polymer on the surface of porous particles (a hollow particle precursor in the case of hollow particles). Herein, silicic acid solution may be also utilized in combination with the aforesaid alkoxysilane to form a cover layer. The addition amount of an organosilicon compound or a silicic acid solution, which is utilized for cover layer formation, is as much as to sufficiently cover the surface of colloidal particles and the solution is is added into a dispersion of porous particles (a hollow particle precursor in the case of hollow particles) at an amount to make a thickness of the finally obtained silica cover layer of 1-20 nm. Further, in the case that the aforesaid silica protective film is formed, an organosilicon compound or a silicic acid solution is added at an amount to make a thickness of the total of a silica protective film and a silica cover layer of 1-20 nm.

Next, a dispersion of particles provided with a cover layer is subjected to a thermal treatment. By a thermal treatment, in the case of porous particles, a silica cover layer, which covers the surface of porous particles, becomes minute to prepare a dispersion of complex particles comprising porous particles covered with a silica cover layer. Further, in the case of a hollow particle precursor, the formed cover layer becomes minute to form a hollow particle wall, whereby a dispersion of hollow particles provided with a hollow, the interior of which is filled with a solvent, a gas or a porous solid, is prepared.

Thermal treatment temperature at this time is not specifically limited provided being so as to block micropores of a silica cover layer, and is preferably in a range of 80-300° C. At a thermal treatment temperature of lower than 80° C., a silica cover layer may not become minute to completely block the micro-pores or the treatment time may become long. Further, when a prolonged treatment at a thermal treatment temperature of higher than 300° C. is performed, particles may become minute and an effect of a low refractive index may not be obtained.

A refractive index of inorganic particles prepared in this manner is as low as 1.44. It is estimated that the refractive index becomes low because such inorganic particles maintain porous property in the interior of porous particles or the interior is hollow.

It is preferable that other than minute hollow particles, the low refractive index layer incorporates hydrolyzed products of alkoxysilicon compounds and condensation products which are formed via the following condensation reaction. It is particularly preferable to incorporate a $SiO_2$ sol prepared employing the alkoxysilicon compounds represented by following Formula (1) and/or (2) or hydrolyzed products thereof.

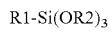 Formula (1)

 Formula (2)

wherein R1 represents a methyl group, an ethyl group, a vinyl group, or an organic group incorporating an acryloyl group, a methacryloyl group, an amino group, or an epoxy group, and R2 represents an methyl gropup or an ethyl group.

Hydrolysis of silicon alkoxide and silane coupling agents is performed by dissolving the above in suitable solvents. Examples of used solvents include ketones such as methyl ethyl ketone, alcohols such as methanol, ethanol, isopropyl alcohol, or butanol, esters such as ethyl acetate, or mixtures thereof.

Water in a slightly larger amount for hydrolysis is added to a solution prepared by dissolving the above silicon alkoxide or silane coupling agents in solvents, and the resulting mixture is stirred at 15-35° C. but preferably 20-30° C. for 1-48 hours but preferably 3-36 hours.

It is preferable to employ catalysts during the above hydrolysis. Preferably employed as such catalysts are acids such as hydrochloric acid, nitric acid, or sulfuric acid. These acids are employed in the form of an aqueous solution at a concentration of 0.001-20.0 N, but preferably 0.005-5.0 N. It is possible to employ water in the above aqueous catalyst solution as water for hydrolysis.

Alkoxysilicon compounds undergo hydrolysis over the specified period of time, and the hydrolyzed alkoxysilicon solution is diluted with solvents, followed by the addition of other necessary additives, whereby a low refractive index layer liquid coating composition is prepared. It is possible to form a low refractive index layer on a substrate by applying the above liquid coating composition onto a substrate such as a film followed by drying.

<Alkoxysilicon Compounds>

In the present invention, preferred as alkoxysilicon compounds (hereinafter also referred to as alkoxysilanes) employed to prepare the low refractive index layer liquid coating composition are those represented by following Formula (3).

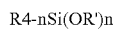 Formula (3)

wherein R' represents an alkyl group; R represents a hydrogen atom or a univalent substituent; and n represents 3 or 4.

The alkyl groups represented by R' include groups such as a methyl group, an ethyl group, a propyl group, or a butyl group, which may have a substituent. The substituents are not particularly limited as long as characteristics as an alkoxysilane are maintained. Examples of such substituents include a halogen atom such as fluorine and an alkoxy group, but unsubstituted alkyl groups are more preferred. Particularly preferred are a methyl group and an ethyl group.

The univalent substituents represented by R are not particularly limited, and examples include an alkyl group, a cycloalkyl group, an alkenyl group, an aryl group, an aromatic heterocyclyl group, and a silyl group. Of these, preferred are an alkyl group, a cycloalkyl group, and an alkenyl group. These may be further substituted. Cited as substituents of R are a halogen atom such as a fluorine atom or a chlorine atom, an amino group, an epoxy group, a mercapto group, a hydroxyl group, and an acetoxy group.

Specific preferable examples of the alkoxysilane represented by the above formula include tetramethoxysilane, tetraethoxysilane (TEOS), tetra-n-propoxysilane, tetraisopropoxysilane, tetra-n-butoxysilane, tetra-t-butoxysilane, tetrakis(methoxyethoxy)silane, tetrakis(methoxypropoxy) silane, methyltrimethoxysilane, methyltriethoxysilane, ethyltrimethoxysilane, ethyltriethoxysilane, n-propyltrimethoxysilane, n-propyltriethoxysilane, n-butyltrimethoxysilane, i-butyltrimethoxysilane, n-hexyltrimethoxysilane, 3-glycydoxyproyltrimethoxysilane, 3-aminopropyltriethoxysilane, 2-(3,4-epoxycyclohexyl)ethyltrimethoxysilane, 3-chloropropyltrimethoxysilane, 3-mercaptopropyltrimethoxysilane, acetoxytriethoxysilane, (heptadecafluoro-1,1,2,2-tetrahydrodecyl)trimethoxysilane, (3,3,3-trifluoropropyl)trimethoxysilane, (3,3,3-trifluoropropyl)trimethoxysilane, pentafluorophenylpropyltrimethoxysilane, further vinyltrimethoxysilane, vinyltriethoxysilane, phenyltrimethoxysilane, vinyltrimethoxysilane, and vinyltriethoxysilane.

Further, included may be silicon compounds in the form of oligomers such as SILICATE 40, SILICATE 45, SILICATE 48, and M SILICATE 51, produced by Tamagawa Chemical Co., which are partial condensation products of the above compounds.

Since the above alkoxysilanes incorporate silicon alkoxide group capable of undergoing hydrolysis polycondensation, the network structure of polymer compounds is formed in such a manner that these alkoxysilanes undergo hydrolysis, condensation and crosslinking. The resulting composition is employed as a low refractive index layer liquid coating composition which is applied onto a substrate and dried, whereby a layer uniformly incorporating silicon oxide is formed on the substrate.

It is possible to perform a hydrolysis reaction employing the method known in the art. Hydrophilic alkoxysilanes are dissolved in a mixture of water of the specified amount and hydrophilic organic solvents such as methanol, ethanol, or acetonitrile so that alkoxysilanes are compatible with solvents. After the addition of hydrolysis catalysts, alkoxysilanes undergo hydrolysis and condensation. By performing the hydrolysis and condensation reaction commonly at 10-100° C., silicate oligomers in a liquid state, having at least two hydroxyl groups, are formed, whereby a hydrolyzed liquid composition is prepared. It is possible to appropriately control the degree of hydrolysis varying the amount of employed water.

In the present invention, preferred as solvents added to alkoxysilanes together with water are methanol and ethanol since they are less expensive and form a layer exhibiting excellent characteristics and desired hardness. It is possible to employ isopropanol, n-butanol, isobutanol, and octanol, while the hardness of the resulting layer tends to decrease. The amount of solvents is commonly 50-400 parts by weight with respect to 100 parts by weight of tetraalkoxysilanes prior to hydrolysis, but is preferably 100-250 parts by weight.

The hydrolyzed liquid composition is prepared as described above. The above composition is diluted with solvents, and if desired, added with additives. Subsequently, components required to form a low refractive index layer liquid coating composition are mixed, whereby a low refractive index layer liquid coating composition is prepared.

Cited as hydrolysis catalysts may be acids, alkalis, organic metals, and metal alkoxides. In the present invention, preferred are inorganic acids such as sulfuric acid, hydrochloric acid, nitric acid, hypochlorous acid, or boric acid, or organic acids. Of these, particularly preferred are nitric acid, carboxylic acids such as acetic acid, polyacrylic acid, benzenesulfonic acid, paratoluenesulfonic acid, and methylsulfonic acid. Of these, most preferably employed are nitric acid, acetic acid, citric acid, and tartaric acid. Other than above citric acid and tartaric acid, also preferably employed are levulinic acid, formic acid, propionic acid, malic acid, succinic acid, methylsuccinic acid, fumaric acid, oxalacetic acid, pyruvic acid, 2-oxoglutaric acid, glycolic acid, D-glyceric acid, D-gluconic acid, malonic acid, maleic acid, oxalic acid, isocitric acid, and lactic acid.

Of the above catalysts, preferred are those which do not remain in the layer via evaporation during drying and also exhibit a low boiling point. Accordingly, acetic acid and nitric acid are most preferred.

The added amount is commonly 0.001-10 parts by weight with respect to 100 parts by weight of the employed alkoxysilicon compounds (for example, tetraalkoxysilane), but is preferably 0.005-5 parts by weight. Further, the added amount of water is to be at least the amount capable of performing theoretically 100% hydrolysis of the compound to be hydrolyzed. It is recommended to add water in an equivalent amount of 100-300%, but preferably of 100-200%.

During the hydrolysis of the above alkoxysilanes, it is preferable to blend the following minute inorganic particles.

After initiation of hydrolysis, a hydrolyzed liquid composition is allowed to stand over the specified period of time. After the hydrolysis reaches the specified degree, the above catalysts are employed. The standing period refers to the sufficient period during which the above hydrolyses and crosslinking due to condensation are progressed to result in desired layer characteristics. The specific period varies depending on the type of acid catalysts, but when acetic acid is employed, the period is at least 15 hours at room temperature, while when nitric acid is employed, the period is preferably at least two hours. Ripening temperature affects ripening temperature. Generally, at a higher temperature, ripening is more promoted. However, since gelling occurs at more than or equal to 100° C., it is appropriate to raise and maintain the temperature between 20-60° C.

The silicate oligomer solution prepared by performing hydrolysis and condensation as described above is added with the above minute hollow particles and additives, and the resulting mixture is diluted as required, whereby a low refractive index layer liquid coating composition is prepared. Subsequently, the resulting coating composition is applied onto the above film, whereby it is possible to form a layer as a low refractive index layer composed of an excellent silicon oxide layer.

Further, in the present invention, other than the above alkoxysilanes, employed may be the compounds which are prepared by modifying silane compounds (being monomers, oligomers, or polymers) having a functional group such as an epoxy group, an amino group, an isocyanate group, or a carboxyl group, and may be employed individually or in combination.

(Fluorine Compounds)

It is preferable that the low refractive index layer employed in the present invention incorporates minute hollow particles and fluorine compounds, and also incorporates fluorine containing resins (hereinafter also referred to as "pre-crosslinking fluorine containing resins"), which undergo crosslinking via heat or ionizing radiation. By incorporating the above fluorine containing resins, it is possible to provide a desired stain resistant antireflection film.

Preferably listed as such fluorine containing resins prior crosslinking may be fluorine containing copolymers which are formed employing fluorine containing vinyl monomers and monomers to provide a crosslinking group. Specific examples of the above fluorine containing vinyl monomer units include fluoroolefins (for example, fluoroethylene, vinylidene fluoride, tetrafluoroethylene, hexafluoroethylene, hexafluoropropylene, or perfluoro-2,2-dimethyl-1,3-dioxonol), and alkylester derivatives in which (meth)acrylic acid is partially or completely fluorinated (for example, VISCOAT 6FM (produced by Osaka Yuki Kagaku Co.), or M-2020 (produced by Daikin Co.), completely or partially fluorinated vinyl ethers. Cited as monomers to provide a crosslinking group are vinyl monomers which previously incorporate a crosslinking functional group in the molecule such as glycidyl methacrylate, vinyltrimethoxysilane, γ-methacryloyloxypropyltrimethoxysilane, vinyl glycidyl ether, and in addition, vinyl monomers having a carboxyl group, a hydroxyl group, an amino group, or a sulfone group (for example, (meth)acrylic acid, methylol(meth)acrylate, hydroxyalkyl(meth)acrylate, allyl acrylate, hydroxyalkyl vinyl ether, or hydroxyalkyl allyl ether). JP-A Nos. 10-25388 and 10-147739 describe that it is possible to introduce, after copolymerization, a crosslinking structure to the latter via the addition of compounds having a group capable of reacting with a functional group in the polymers and at least one reactive group. Examples of such crosslinking groups include an acryloyl, methacryloyl, isocyanate, epoxy, aziridine, oxazolidine, aldehyde, carbonyl, hydrazine, carboxyl, methylol, or active methylene group. Cases, in which fluorine containing polymers react with a crosslinking group upon being heated, or undergo crosslinking upon being heated via combinations such as an ethylenic unsaturated group and a thermally radical generating agent, or an epoxy group and a thermally acid generating agents, are designated as a thermal curing type. On the other hand, cases in which crosslinking is performed via combination of an ethylenic unsaturated group and a photolytically radical generating agent or an epoxy group and a photolytically acid generating agent upon being exposed to radiation (preferably ultraviolet radiation or electron beams), is designated as an ionizing radiation curing type.

In addition to the above monomers, employed as pre-crosslinking fluorine containing resins may be fluorine containing copolymers which are prepared simultaneously employing monomers other than the fluorine containing vinyl monomers and monomers to provide a crosslinking group. Simultaneously usable monomers are not particularly limited and may include olefins (such as ethylene, propylene, isoprene, vinyl chloride, or vinylidene chloride); acrylic acid esters (such as methyl acrylate, ethyl acrylate, or 2-etylhexyl acrylate); methacrylic acid esters (such as methyl methacrylate, ethyl methacrylate, butyl methacrylate, or ethylene glycol dimethacrylate); styrene derivatives (such as styrene, divinylbenzene, vinyltoluene, or α-methylstyrene); vinyl ethers (such as methyl vinyl ether); vinyl esters (such as vinyl acetate, vinyl propionate, or vinyl cinnamate); acrylamides (such as N-tert-butyl acrylamide or N-cyclohexyl acrylamide); methacrylamides; and acrylonitrile derivatives. Further, in order to provide lubrication and stain resistance, it is preferable to introduce a polyorganosiloxane skeleton and a perfluoropolyether skeleton into the fluorine containing copolymers. Such skeletons are formed via polymerization of polyorganosiloxane having a terminal group such as an acryl group, a methacryl group, a vinyl ether group, or a styryl group with the above monomers, polymerization of the above monomers with polyorgsanosiloxane having a radical generating group at the terminal or perfluoropolyether, or reaction of polyorganosiloxane having a functional group at the terminal or perfluoropolyether.

The used ratio of each of the above monomers employed to from the fluorine containing copolymers prior to crosslinking is preferably 20-70 mol % with respect to the fluorine containing vinyl monomers, but is more preferably 40-70 mol % and the used ratio of monomers to provide a crosslinking group is preferably 1-20 mil %, but is more preferably 5-20 mol %, while the ratio of simultaneously employed other monomers is preferably 10-70 mol %, but is more preferably 10-50 mol %.

It is possible to prepare fluorine containing copolymers via polymerization in the presence of radical polymerization initiators, employing methods such as solution polymerization, bulk polymerization, emulsion polymerization, or suspension polymerization.

Pre-crosslinking fluorine containing resins are commercially available. Examples of commercially available pre-crosslinking fluorine containing resins include SAITOP (produced by Asahi Glass Co.), TEFLON (registered trade name) AF (produced by DuPont), polyvinylidene fluoride, RUMI-FRON (produced by Asahi Glass Co.), and OPSTAR (produced by JSR).

The Dynamic friction coefficient and the contact angle to water of the low refractive index layer composed of crosslinked fluorine containing resins are preferably in the range of 0.03-0.15 and 90-120 degrees, respectively.

<Additives>

If desired, it is possible to incorporate additives such as silane coupling agents or hardening agents in the low refractive index liquid coating composition. The silane coupling agents are the compounds represented by above Formula (2).

Specific examples include vinyltriethoxysilane, γ-methacryloxypropyltrimethoxysilane, γ-glycidoxypropyltrimethoxysilane, and 3-(2-aminoethylaminopropyl)trimethoxysilane.

Cited as hardening agents are organic acid metal salts such as sodium acetate or lithium acetate, of which sodium acetate is particularly preferred. The added amount to the silicon-alkoxysilane hydrolyzed solution is preferably in the range of about 0.1- about 1 part by weight with respect to 100 parts by weight of solids in the hydrolyzed solution.

Further, it is preferable to add, to the low refractive index layer employed in the present invention, various leveling agents, surface active agents, and low surface tension substances such as silicone oil.

Specific commercially available silicone oils include L-45, L-9300, FZ-3704, FZ-3703, FZ-3720, FZ-3786, FZ-3501, FZ-3504, FZ-3508, FZ-3805, FZ-3707, FZ-3710, FZ-3750, FZ-3760, FZ-3785, FZ-3785, and Y-7400 of Nippon Unicar Co., Ltd., as well as KF96L, KF96, KF96H, KF99, KF54, KF965, KF968, KF56, KF995, KF351, KF352, KF353, KF354, KF355, KF615, KF618, KF945, KF6004, and FL100 of Shin-Etsu Chemical Co., Ltd.

These components enhance coatability onto a substrate or a lower layer. When incorporated in the uppermost layer of the multicoated layers, water- and oil-repellency, and anti-staining are enhanced and in addition, abrasion resistance of the surface is also enhanced. Since the excessive addition of these components results in repellency during coating, the added amount is preferably in the range of 0.01-3% by weight with respect to the solids in the liquid coating composition.

<Solvents>

Solvents employed in the liquid coating composition during coating the low refractive index layer include alcohols such as methanol, ethanol, 1-propanol, 2-propanol, or butanol; ketones such as acetone, methyl ethyl ketone, or cyclohexanone; aromatic hydrocarbons such as benzene, toluene, or xylene; glycols such as ethylene glycol, propylene glycol, or hexylene glycol; glycol ethers such as ethyl cellosolve, butyl cellosolve, ethyl CARBITOL, butyl CARBITOL, diethyl cellosolve, diethyl CARBITOL, or propylene glycol monomethyl ether; N-methylpyrrolidone, dimethylformamide, methyl lactate, ethyl lactate, methyl acetate, and water. These may be employed individually or in combinations of at least two types.

<Coating Methods>

The low refractive index layer is coated employing the methods known in the art, such as dipping, spin coating, knife coating, bar coating, air doctor coating, curtain coating, spray costing, or die coating, as well as ink-jet methods known in the art. Coating methods which enable continuous coating and thin layer coating are preferably employed. The coated amount is commonly 0.1-30 μm in term of wet thickness, but is preferably 0.5-15 μm. The coating rate is preferably 10-80 m/minute.

When the composition of the present invention is applied onto a substrate, it is possible to control layer thickness and coating uniformity by regulating the solid concentration in the liquid coating composition and the coated amount.

In the present invention, it is also preferable to form an antireflection layer composed of a plurality of layers in such a manner that the medium refractive index layer and high refractive index layer, described below, are provided.

The configuration example of the antireflection layer usable in the present invention is described below, however the antireflection layer is not limited thereto.

Cellulose ester film/hard coat layer/low refractive index layer

Cellulose ester film/hard coat layer/medium refractive index layer/low refractive index layer Cellulose ester film/hard coat layer/high refractive index layer/low refractive index layer Cellulose ester film/hard coat layer/medium refractive index layer/high refractive index layer/low refractive index layer Cellulose ester film/antistatic layer/hard coat layer/medium refractive index layer/high refractive index layer/low refractive index layer Cellulose ester film/hard coat layer/antistatic layer//medium refractive index layer/high refractive index layer/low refractive index layer Antistatic layer/cellulose ester film/hard coat layer/medium refractive index layer/high refractive index layer/low refractive index layer Cellulose ester film/hard coat layer/high refractive index layer/low refractive index layer/high refractive index layer/ low refractive index layer (Medium Refractive Index Layer and High Refractive Index Layer)

The constituting components of the medium and high refractive index layers are not particularly limited as long as the specified refractive index layer is prepared. However, it is preferable that the above layer is composed of the following minute metal oxide particles at a high refractive index, and binders. Other additives may be incorporated. The refractive index of the medium refractive index layer is preferably 1.55-1.75, while that of the high refractive index layer is preferably 1.75-2.20. The thickness of the high and medium refractive index layers is preferably 5 nm-1 μm, is more preferably 10 nm-0.2 μm, but is most preferably 30 nm-0.1 μm. It is possible to coat those layers employing the same coating method as that of the above low refractive index layer.

<Minute Metal Oxide Particles>

Minute metal oxide particles are not particularly limited. For example, employed as a main component may be titanium dioxide, aluminum oxide (alumina), zirconium oxide (zirconia), zinc oxide, antimony-doped tin oxide (ATO), antimony pentaoxide, indium-tin oxide (ITO), and iron oxide, which may be blended. In the case of use of titanium dioxide, in term of retardation of activity of photocatalysts, it is preferably to employ core/shell structured minute metal oxide particles which are prepared in such a manner that titanium oxide is employed as a core and the core is covered with a shell composed of alumina, silica, zirconia, ATO, ITO, or antimony pentaoxide.

The refractive index of minute metal oxide particles is preferably 1.80-2.60, but is more preferably 1.90-2.50. The average diameter of the primary particles of the minute metal oxide particles is preferably 5 nm-200 nm, but is more preferably 10-150 nm. When the particle diameter is excessively small, minute metal oxide particles tend to aggregate to degrade dispersibility, while when it is excessively large, haze is undesirably increased. Minute inorganic particles are preferably in the form of rice grain, needle, sphere, cube, or spindle, or amorphous.

Minute metal oxide particles may be surface-treated with organic compounds. Examples of such organic compounds include polyol, alkanolamine, stearic acid, silane coupling agents, and titanate coupling agents. Of these, most preferred are silane coupling agents, described below. At least two types of surface treatments may be combined.

It is possible to prepare high and medium refractive index layers exhibiting desired refractive indices via appropriate selection of the type of metal oxides and the addition ratio thereof.

<Binders>

Binders are incorporated to improve film forming properties and physical properties of a coating. Employed as such binders may, for example, be the aforesaid ionizing radiation curing type resins, acrylamide derivatives, multifunctional acrylates, acrylic resins, and methacrylic resins.

(Metal Compounds and Silane Coupling Agents)

Incorporated as other additives may be metal compounds and silane coupling agents, which may be employed as a binder.

Employed as the metal compounds may be the compounds represented by Formula (4) or chelate compounds thereof.

$$AnMBx-n \qquad \text{Formula (4)}$$

wherein M represents a metal atom; A represents a hydrolysable functional group or a hydrocarbon group having a hydrolysable functional group; B represents a group of atoms, which covalently or ionically bonds metal M; x represent valence of metal atom M; and n represents an integer of 2-x.

Examples of hydrolysable functional group A include an alkoxyl group, a halogen atom such as a chorine atom, an ester group, and an amido group. Preferred as the compounds represented by above Formula (4) are alkoxides having at least two alkoxyl groups bonding a metal atom, or chelate compounds thereof. In view of refractive index, reinforcing effects of coating strength, and ease of handling, cited as preferred metal compounds are titanium alkoxides, zirconium alkoxides, and silicon alkoxides, or chelate compounds thereof. Titanium alkoxides exhibits a high reaction rate, a high refractive index, and ease of handling. However, its excessive addition degrades lightfastness due to its photocatalytic action. Zirconium akloxides exhibit a high refractive index, but tends to result in cloudiness, whereby careful dew point management is required during coating. On the other hand, silicon alkoxides exhibit a low reaction rate and a low refractive index, but ease of excellent handling and excellent lightfastness. Silane coupling agents can react with both minute inorganic particles and organic polymers, whereby it is possible to prepare a strong coating. Further, titanium aloxides enhance reaction with ultraviolet radiation curing resins and metal alkoxides, whereby it is possible to enhance physical characteristics of a coating even by a small amount of their addition.

Examples of titanium alkoxides include tetramethoxytitaium, tetraethoxytitanium, tetra-iso-propoxytitanium, tetra-n-propoxytitanium, tetr-n-butoxytitanium, tetra-sec-butoxytitanium, and tetra-tert-butoxytitanium.

Examples of zirconium alkoxides include tetramethoxyzirconium, tetraethoxyzirconium, tetra-iso-propoxyzirconium, tetra-n-proxyzirconium, tetra-n-butoxyzirconium, tetra-sec-butoxyzirconium, and tetra-tert-butoxyzirconium.

Silicon alkoxides and silane coupling agents are the compounds represented by following Formula (5).

$$RmSi(OR')n \qquad \text{Formula (5)}$$

wherein R represents a reactive group such as an alkyl group (preferably an alkyl group having 1-10 carbon atoms), a vinyl group, a (meth)acryloyl group, an epoxy group, an amido group, a sulfonyl group, a hydroxyl group, a carboxyl group, or an alkoxyl group, R' represents an alkyl group (preferably an alkyl group having 1-10 carbon atoms), and m+n is 4.

Specifically cited are tetramethoxysilane, tetraethoxysilane, tetra-iso-propoxysilane, tetra-n-propoxysilane, tetra-n-butoxysilane, tetra-sec-butoxysilane, tetra-tert-butoxysilane, terapentaethoxysilane, methyltrimethoxysilane, methyltriethoxysilane, methyltriproxysilane, methyltributoxysilane, dimethyldimethoxysilane, dimethyldiethoxysilane, hexyltrimethoxysilane, vinyltriethoxysilane, γ-methacryloxypropyltrimethoxysilane, γ-glycidoxypropyltrimethoxysilane, and 3-(2-aminoethylaminopropyl)trimethoxysilane.

Cited as preferred chelating agents which are allowed to coordinate with a free metal compound to form a chelate compound may be alkanolamines such as diethanolamine or triethanolamine; glycols such acetylene glycol, diethylene glycol, or propylene glycol; and acetylacetone, ethyl acetacetate, having a molecular weight of at most 100,000. By employing such chelating agents, it is possible to prepare chelate compounds which are stable for water mixing and exhibit excellent coating strengthening effects.

In the medium refractive index composition, the added amount of the metal compounds is preferably less than 5% by weight in terms of metal oxides, while in the high refractive index composition, the same is preferably less than 20% by weight in terms of metal oxides.

<Polarizing Plate>

The following describes the polarizing plate of the present invention:

The polarizing plate of the present invention preferably has a thickness of 70 through 140 μm. As described above, this polarizing plate is preferably clamped by the retardation film of the present invention and at least one polarizing plate protective film. The "thickness" of the polarizing plate in the sense in which it is used here refers to the total thickness including those of the polarizing film, the aforementioned retardation film and polarizing plate protective film, without thickness of the adhesive layer being included. When the aforementioned polarizing plate protective film contains a hard coated layer and functional layer, the thicknesses thereof are also included.

To ensure the advantages of the present invention, the thickness of the polarizing plate is preferably within the aforementioned range, more preferably 80 through 120 μm. If this thickness is below 70 μm, the toughness of the polarizing plate will be reduced. When the liquid crystal cell is to be bonded, such a defect as wrinkles or inclusion of air bubbles will easily occur. If the thickness is over 140 μm, the polarizing plate will be subjected to irregular deformation or distortion when the plate is dried or is stored for a long period of time.

In the polarizing plate of the present invention, the film having different refractive indexes on both surfaces is required to be used at least as a protective film on one side. The film is preferably bonded in such a direction that the surface having a higher refractive index is located on the side of the PVA (polarizing film).

Assuming that the thickness of the retardation film of the present invention is d1, and that of the polarizing plate protective film opposed thereto is d2, the ratio of thickness between this retardation film and this polarizing plate protective film (d2/d1) is preferably 1.1 through 2.0, and polarizing plate preferably has a thickness of 70 through 140 μm. To be more specific, if the polarizing plate protective film farther from the liquid crystal cell is thicker than the polarizing plate protective film closer to the liquid crystal cell (retardation film in the present invention), a curl can be more easily provided in such a way that the adhesive layer of the polarizing plate per se will be located on the outer side—an advantage ensured by the use of the retardation film of the present invention. This will reduce the possibility of causing a trouble at the time of bonding the liquid crystal cell of the polarizing plate.

The polarizing plate can be manufactured according to the conventional method. It is preferred that the retardation film of the present invention should be subjected to alkaline saponification, and the alkaline saponified retardation film should be bonded on at least one of the surfaces of the polarizing film of the present invention using a fully saponified polyvinyl alcohol aqueous solution. Either the retardation film of the present invention or another polarizing plate protective film may be used on the other surface. A commercially available cellulose ester film can be used as the polarizing plate protective film used on the other surface with respect to the retardation film of the present invention. For example, KC8UX2M, KC4UX, KC5UX, KC4UY, KC8UY, KC12UR and KC8UX-RHA (by Konica Minolta Opto, Inc.) are preferably used as the commercially available cellulose ester film.

It is also preferred to use the polarizing plate protective film also serving as an optical correction film having an optical anisotropic layer formed by orienting such as liquid crystal compound as a discotheque liquid crystal, rod-like liquid crystal and cholesteric liquid crystal. For example, the optical anisotropic layer can be formed according to the method disclosed in the Japanese Non-Examined Patent Publication 2003-98348. Further, if the polarizing plate protective film used in the present invention is a polarizing plate protective film equipped with an antireflection layer, it is possible to produce a polarizing plate characterized by excellent antireflection properties and a stable effect of increasing a field of view.

The polarizing film is drawn in the uniaxial direction (normally in the longitudinal direction). Accordingly, when the polarizing plate is placed in an environment of high temperature and high humidity, the plate will contract in the direction of drawing (normally in the longitudinal direction), and will expand in the direction perpendicular to drawing (normally in the crosswise direction). As the polarizing plate protective film is thinner, the ratio of expansion and contraction of the polarizing plate is greater. Especially there is an increase in the contraction in the direction where the polarizing film is drawn. Normally, the direction of drawing the polarizing film corresponds to the direction of casting the polarizing plate protective film is cast (MD direction). Accordingly, when the polarizing plate protective film is made thinner, it is particularly important to suppress the ratio of expansion and contraction especially in the direction of flow-casting. The retardation film of the present invention is characterized by excellent dimensional stability, and is preferably used as the aforementioned polarizing plate protective film.

When durability test is conducted in an environment of 60° C. and 90% RH, satisfactory visibility is ensured without wavy irregular form being increased, or without the angle of visibility being changed subsequent to durability test.

The polarizing plate is formed by bonding a protective film on one of the surfaces of the polarizing plate, and a separate film on the opposite surface. The protective film and separate film are used to protect the polarizing plate at the time of product inspection prior to shipment of the polarizing plate. In this case, the protective film is bonded to protect the surface of the polarizing plate, and is used on the side opposite to the surface where the polarizing plate is bonded on the liquid crystal plate. Further, the separate film is used to cover the adhesive layer to be bonded to the liquid crystal plate. It is employed on the surface where the polarizing plate is bonded onto the liquid crystal cell.

Use of this polarizing plate provides a liquid crystal display apparatus characterized by excellent display performances. Especially in the liquid crystal display apparatus wherein a backlight located immediately below is employed, it is possible to provide a liquid crystal display apparatus characterized by suppressed environmental fluctuation and reduced leakage of light around the screen.

<Display>

By using the polarizing plate of the present invention, a variety of displays excellent in visibility are provided. The retardation film of the present invention is usable for the liquid crystal displays of various drive modes, such as STN, TN, OCB, HAN, VA (MVA, PVA), and IPS. Of these, preferable is an application of the polarizing plate of the present invention to an VA (MVA, PVA) mode LCD, by which an LCD of 30 inch size or more exhibiting reduced environmental variation of the quality and reduced leakage of light in the peripheral area of the display has been obtained. Specifically, an LCD employing a retardation film of the present invention exhibited reduced environmental variation of the quality and reduced leakage of light in the peripheral area of the display.

Moreover, although the backlight unit used for the liquid crystal display using the polarizing plate of the present invention may be a sidelight type, a direct illumination tyoe or a combination of both types, however, preferable is a direct illumination backlight unit provided just behind a liquid crystal cell.

A specifically preferable backlight unit include a LED direct illumination backlight unit for a color LCD provided behind a liquid crystal cell containing Red(R) LEDs, Green (G) LEDs and Blue(B) LEDs, of which peak wavelengths are, for example, 610 nm or more for Red(R), 530±10 nm for Green(G), and 480 nm or less for Blue(B). Examples of Green(G) LED having a peak wavelength in the above range include DG112H (made by Stanley Electric Co., Ltd.), UG1112H (made by Stanley Electric Co., Ltd.), E1L51-3G (made by TOYODA GOSEI CO., LTD.), E1L49-3G (made by TOYODA GOSEI CO., LTD.), NSPG500S (made by Nichia Corp.). Examples of Red(D) LED include FR1112H (made by Stanley Electric Co., Ltd.), FR5366X (made by Stanley Electric Co., Ltd.), NSTM515AS (made by Nichia Corp.), GL3ZR2D1COS (product made from Sharp) and GM1JJ35200AE (product made from Sharp). Examples of Blue (B) LED include DB1112H (made by Stanley Electric Co., Ltd.), DB5306X (made by Stanley Electric Co., Ltd.), E1L51-3B (made by TOYODA GOSEI CO., LTD.), E1L4E-SB1A (made by TOYODA GOSEI CO., LTD.), NSPB630S (made by Nichia Corp.) and NSPB310A (made by Nichia Corp.).

LEDs of the above three colorss may be combined to make a backlight or a white LED may be used.

Also, direct illumination backlight units are disclosed, for example, in JP-A No. 2001-281656, JP-A No. 2001-305535 (point-like LEDs are used) and JP-A No. 2002-311412, however, the present invention is not limited thereto.

EXAMPLE

The following describes the present invention with reference to Examples, without the present invention being restricted thereto:

<<Preparation of Retardation Film>>

(Preparation of Retardation Film 101)

The present inventors used the cellulose esters where the replacement ratio and type of the substituent given in Table 1 were variously changed.

TABLE 1

| Cellulose esters | Acetyl group | Propionyl group | Total replacement ratio |
|---|---|---|---|
| A | 1.6 | 0.8 | 2.4 |
| B | 1.6 | 0.9 | 2.5 |
| C | 1.7 | 0.9 | 2.6 |
| D | 1.8 | 1.0 | 2.8 |
| E | 2.7 | — | 2.7 |

| <Particle dispersion liquid> | |
|---|---|
| Particles (Aerosil R972V (manufactured by Japan Aerosil)) (average diameter of the primary particles: 16 nm; apparent specific weight: 90 g/liter) | 11 parts by mass |
| Ethanol | 89 parts by mass |

The inventors stirred the above mixture by a dissolver for 50 minutes and dispersed the particles a Manthon Gaulin.

<Particle-Added Solution>

The inventors prepared a particle-added solution by taking the steps of adding a cellulose ester A into methylene chloride in a dissolution tank; heating the mixture until the cellulose ester was completely dissolved; filtering the solution by a filter paper Azumi No. 244 (manufactured by AZUMI FILTERPAPER CO., LTD); adding the particle dispersion liquid slowly into the filtrated cellulose ester solution) while stirring the solution sufficiently; dispersing the solution by an attriter so that the secondary particles would have a predetermined size; and filtering the dispersion liquid by Finemet NF (manufactured by Nippon Seisen Co., Ltd.), and obtaining a particle-added solution.

| | |
|---|---|
| Methylene chloride | 99 parts by mass |
| Cellulose ester A | 4 parts by mass |
| Particle dispersion liquid | 11 parts by mass |

The inventors prepared a main dope solution of the composition shown below by taking the steps of putting methylene chloride and ethanol in a pressure dissolution tank; adding cellulose ester C into the solvent mixture in the tank while stirring the mixture; heating the mixture while stirring until the cellulose ester is completely dissolved; adding a plasticizer and an ultraviolet absorbent into the solution; and filtering the solution by a filter paper Azumi No. 244 (manufactured by AZUMI FILTERPAPER CO., LTD).

The present inventors put 100 parts (by mass) of main dope solution and 5 parts of particle added solution in Toray static in-line mixer Hi-Mixer SWJ (manufactured by Toray Industries, Inc.), fully mixed the solution, uniformly flow-cast the solution over a 2-m wide stainless band support by the belt flow casting device, let the solvent evaporate from the stainless band support until the quantity of solvent left on the support is 110%, separated the web from the stainless band support, and drew the resulting web with a tensile force to make the longitudinal drawing ratio (MD) 1.0.

Then the 1/a (mm$^{-1}$) that can be obtained from the radius a (mm) of the bend resulting from changing the diameter of the conveyance roll 5 at an atmospheric temperature of 120° C. using the bending machine shown in FIG. 1 was set at 0.022, and the number of bending operations was set at 350 at an interval of 2 seconds. The web was conveyed at a conveyance speed of 20 m/min.

Both ends of the web were clamped by a tenter, and the web was drawn so that the drawing ratio was 1.3 in the cross direction (TD). After the step of drawing, the width was kept unchanged for several seconds to release the cross tensile force. Then the web was released to pass through a drying zone at 125° C. for 30 minutes to dry the web. Taking the aforementioned steps, the inventors prepared the 50 μm-thick retardation film 101 having a 1-cm wide, 8-μm high knurled part on each end.

| <Composition of the main doping solution> | |
|---|---|
| Methylene chloride | 390 parts by mass |
| Ethanol | 80 parts by mass |
| Cellulose ester C | 100 parts by mass |
| Plasticizer: Trimethylol propane tribenzoate | 5 parts by mass |
| Plasticizer: Ethyl phthalyl ethyl glycolate | 5.5 parts by mass |
| Ultraviolet absorbent: TINUVIN 109 (manufactured by Ciba Specialty Chemicals) | 1 part by mass |
| Ultraviolet absorbent: TINUVIN 171 (manufactured by Ciba Specialty Chemicals) | 1 part by mass |

The present inventors produced the retardation films 102 through 114 using the same procedure as the aforementioned, except that the radium of the bend a (mm), number of bending operations and film thickness resulting from changing the composition of the doping solution (cellulose ester), atmospheric temperature and the diameter of the conveyance roll 5 were changed as listed in Table 2.

The in-plane retardation value Ro, retardation value Rt along the thickness and refractive indexes on the front and rear of the retardation films 101 through 114 having been produced were measured according to the following method. Table 2 shows the results.

<Measurement of Retardation Value>

$Ro=(nx-ny)\times d$ $Rt=((nx+ny)/2-nz)\times d$ (where nx, ny and nz represent refractive indexes of the indicatrixes in the direction of the major axes, y and z, respectively, nx and ny indicate the refractive index in the film surface, and nz shows the refractive index of the film along the thickness. nx is greater than ny, and d denotes the thickness (nm) of the film.)

The present inventors attached an eyepiece equipped with polarizing plate to an Abbe refractometer (1 T), and used a spectral light source to measure the refractive indexes in one direction of the film surface on both surfaces of the retardation film, the direction perpendicular thereto, and the direction vertical to the film surface. They calculated the average refractive index from the average value thereof. A commercially available micrometer was used to measure the film thickness.

The inventors kept film samples in a test environment of 23° C. and 55% RH for 24 hours, measured their retardations at a wavelength of 590 nm by an automatic double refractometer KOBRA-21ADH (manufactured by Oji Scientific Instruments), assigned the obtained average refraction index and film thickness values to the aforementioned equations, and calculated in-plane retardation (Ro), retardation (Rt) along the thickness of the film sample, <Measurement of Refractive Index on the Front and Rear>

The present inventors kept film samples in a test environment of 23° C. and 55% RH for 24 hours, and measured the average refractive indexes on the front and rear surfaces of the retardation film by an Abbe refractometer (1 T) at the same environment. The front surface of the film in the sense in which it is used here refers to the surface opposite to the stainless steel band support at the time of casting the doping solution, whereas the rear surface refers to the surface of the stainless steel band support at the time of casting the doping solution.

<<Preparation of polarizing plate protective film>>
(Preparation of polarizing plate protective film 201)
(Silicon dioxide particles)

| | |
|---|---|
| Aerosil R972V (manufactured by Japan Aerosil) (Average diameter of the primary particles: 16 nm; apparent specific weight: 90 g/liter) | 12 parts by mass |
| Ethanol | 88 parts by mass |

The inventors stirred the above mixture by a dissolver for 30 minutes, dispersed the particles a Manthon Gaulin, put methylene chloride to the silicon dioxide particles while stirring, allowed the mixture to be stirred and blended in a dissolver for 30 minutes, thereby obtaining a diluted silicon dioxide dispersion liquid.

| (Preparation of in-line liquid additive) | |
|---|---|
| TINUVIN 109 (by Ciba Specialty Chemicals K.K) | 11 parts by mass |
| TINUVIN 171 (by Ciba Specialty Chemicals K.K) | 5 parts by mass |
| Methylene chloride | 100 parts by mass |

The present inventors put the aforementioned mixture in an enclosed container, heated the mixture while stirring until dissolved completely, and filtered the mixture.

Then the present inventors prepared the in-line liquid additive by taking the steps of adding 36 parts by mass diluted silicon dioxide dispersion liquid to the aforementioned mixture while stirring; allowing it to be stirred for further 30 minutes; adding 6 parts by mass of the aforementioned cellulose triacetate while stirring; allowing it to be stirred for further 60 minutes; and filtering it using the polypropylene wind cartridge filter TCW-PPS-IN (manufactured by Advantec Toyo Co., Ltd.).

TABLE 2

| Phase difference film No. | Cellulosic ester | Bending conditions Atmospheric temperature (° C.) | *1 | Number of bending operations (number of times) | Film thickness (μm) | Retardation value Ro (nm) | Rt (nm) | Film front and rear Rear | Front | Difference in refractive indexes | Remarks |
|---|---|---|---|---|---|---|---|---|---|---|---|
| 101 | C | 120 | 0.022 | 350 | 50 | 45 | 130 | 1.48440 | 1.48040 | 0.00400 | Inv. |
| 102 | C | 120 | 0.022 | 150 | 50 | 50 | 150 | 1.47988 | 1.47835 | 0.00153 | Inv. |
| 103 | C | 120 | 0.013 | 750 | 40 | 40 | 150 | 1.47978 | 1.47762 | 0.00216 | Inv. |
| 104 | C | 120 | 0.033 | 1000 | 50 | 65 | 160 | 1.48244 | 1.48010 | 0.00234 | Inv. |
| 105 | C | 120 | 0.022 | 100 | 50 | 55 | 120 | 1.48322 | 1.48279 | 0.00043 | Comp. |
| 106 | C | 120 | 0.022 | 1100 | 50 | 60 | 155 | 1.48545 | 1.48035 | 0.00510 | Comp. |
| 107 | C | 80 | 0.022 | 350 | 50 | 30 | 100 | 1.48161 | 1.48110 | 0.00051 | Inv. |
| 108 | C | 160 | 0.034 | 350 | 50 | 70 | 180 | 1.48530 | 1.48040 | 0.00490 | Inv. |
| 109 | C | 120 | 0.011 | 350 | 50 | 65 | 175 | 1.48270 | 1.47775 | 0.00495 | Inv. |
| 110 | A | 120 | 0.022 | 350 | 40 | 45 | 130 | 1.48421 | 1.48040 | 0.00381 | Inv. |
| 111 | B | 120 | 0.022 | 350 | 40 | 45 | 130 | 1.47885 | 1.47665 | 0.00220 | Inv. |
| 112 | B | 120 | 0.022 | 350 | 20 | 55 | 120 | 1.48363 | 1.48305 | 0.00058 | Inv. |
| 113 | D | 130 | 0.017 | 500 | 80 | 60 | 180 | 1.49113 | 1.48125 | 0.00988 | Comp. |
| 114 | E | 130 | 0.029 | 500 | 40 | 5 | 45 | 1.47889 | 1.47878 | 0.00011 | Comp. |

*1: 1/a (mm$^{-1}$) assuming that the radium of the film being bent is assumed as a (mm)
Inv.: Invention,
Comp.: Comparative example

| (Preparation of doping solution) | |
|---|---|
| Cellulose ester (cellulose triacetate synthesized from linter cotton) (Mn = 148000, Mw = 310000, Mw/Mn = 2.1, Acetyl group replacement ratio of 2.92) | 100 parts by mass |
| Trimethylol propane tribenzoate | 5.0 parts by mass |
| Ethylphthalylethylglycolate | 5.5 parts by mass |
| Methylene chloride | 440 parts by mass |
| Ethanol | 40 parts by mass |

The present inventors prepared the doping solution by taking the steps of putting the aforementioned mixture in an enclosed container, heating the mixture while stirring until dissolved completely, and filtering the mixture using the filter paper Azumi No. 24 (by AZUMI FILTERPAPER CO., LTD).

The present inventors filtered the doping solution in the film production line using the Finemet NF (manufactured by Nippon Seisen Co., Ltd.), filtered the in-line liquid additive in the in-line liquid additive line by the Finemet NF of Nippon Seisen Co., Ltd., added 2 parts by mass of the filtered in-line liquid additive to 100 parts by mass of the filtered doping solution, mixed them sufficiently by an in-line mixer (Toray static in-line mixer Hi-Mixer SWJ manufactured by Toray Industries, Inc.), and cast it uniformly at a width of 1.8 m over the stainless steel band support at a temperature of 35° C. using a belt casting apparatus. The solvent was left to evaporate on the stainless steel band support until the amount of residual solvent would be 120%, and the web was then separated from the stainless steel band support. Then the solvent was left to evaporate from the cellulose ester web at 35° C., and the web was slit to a width of 1.65 m. After that, being drawn at a drawing ratio of 1.05 in the TD direction (in the direction perpendicular to the direction the film is conveyed) by a tenter, the web was dried at a drying temperature of 135° C. In this case, the residual amount of solvent at the time of starting drawing by the tenter was 30%.

After that, the present inventors prepared polarizing plate protective film 201 having an average film thickness of 80 μm by taking the further steps of terminating the drying operation while conveying the web by multiple rolls through the drying zone having a temperature of 110° C. and 120° C., slitting the web to a width of 1.5 mm, and providing a knurled portion having a width of 15 mm and an average height of 10 μm on both ends of the film.

The present inventors measured the retardation value. Ro and Rt were found to be 3 nm and 20 nm, respectively. The film was not the retardation film in the sense in which this term was used in the present invention.

(Preparation of Polarizing Plate Protective Film 202)

The present inventors prepared the polarizing plate protective film 202 having been a width of 1.5 m and an average film thickness of 60 μm in the same procedure as that of the polarizing plate protective film 1 except that the average film thickness was changed to 60 μm.

Ro and Rt were found to be 2 nm and 17 nm, respectively. The film was not the retardation film in the sense in which this term was used in the present invention.

(Preparation of Polarizing Plate Protective Film 203)

The present inventors prepared the polarizing plate protective film 203 having been a width of 1.5 m and an average film thickness of 40 μm in the same procedure as that of the polarizing plate protective film 1 except that the average film thickness was changed to 40 μm.

Ro and Rt were found to be 1 nm and 15 nm, respectively. The film was not the retardation film in the sense in which this term was used in the present invention.

<<Preparation of Polarizing Plate>>

<Preparation of Polarizing Plate>

The present inventors prepared the polarizing film having a thickness of 20 μm by taking the steps of uniaxially drawing a 120 μm-thick polyvinyl alcohol film (at a temperature of 110° C. and a drawing magnification of ×5), immersing the drawn film in an aqueous solution of 0.075 g of iodine, 5 g of potassium iodide, and 100 g of water for 60 seconds and then in an aqueous solution of 6 g of potassium iodide, 7.5 g of boric acid, and 100 g of water at 68° C., rinsing and drying the film.

The present inventors prepared the polarizing plates 1 through 22 by bonding the aforementioned polarizing film having been prepared in combinations given in the following Table 3 according to the following processes 1 through 5 so that this polarizing film having would be clamped by the aforementioned retardation films 101 through 114 and polarizing plate protective films 201 through 203. The retardation films 101 through 114 were bonded in such a way that the surface of higher refractive index was located on the side of the polarizing film.

Process 1: The present inventors prepared the retardation film and polarizing plate protective film by immersing the film in an aqueous solution containing 2 mol/L of sodium hydroxide at 60° C. for 90 seconds, rinsing and dying the film, and then saponifying the surface to be bonded to the polarizing film.

Process 2: The present inventors immersed the aforementioned polarizing film in a polyvinyl alcohol adhesive tank containing 2% by mass of solids for 1 through 2 seconds.

Process 3: The present inventors gently wiped the excessive adhesive attached to the polarizing film in the process 2, and put the film on the retardation film and polarizing plate protective film having been treated in the process 1.

Process 4: The present inventors bonded the retardation film and polarizing film has been laminated in the process 3, and the polarizing plate protective film on the rear surface at a pressure of 20 through 30 N/cm², and a conveyance speed of about 2 m/min.

Process 5: The present inventors prepared the polarizing plate 1 through 22 by using a dryer of 80° C. to dry for five minutes the sample formed by bonding the polarizing film having been prepared in the process 4 and the retardation film and polarizing plate protective film.

<<Preparation of Liquid Crystal Display Apparatus>>

The present inventors prepared the liquid crystal panel according to the following procedure and evaluated the characteristics thereof as a polarizing plate and a liquid crystal display apparatus:

The present inventors separated the pre-bonded polarizing plate from both surfaces of the SONY-made 20 type display KLV-20AP2, and bonded the above prepared polarizing plates 1 through 22 onto the glass surfaces of the liquid crystal cells, respectively.

In this case, the polarizing plates were bonded in such a way that the surfaces of the aforementioned retardation films were oriented to the liquid crystal cell side, and absorption axis was located in the same direction of the pre-bonded polarizing plate, whereby liquid crystal display apparatuses 1 through 22 were produced.

<<Evaluation>>

(Curl of the Polarizing Plate)

A 5 mm×5 cm sample was taken from the polarizing plate sample and was left standing in a thermo-hygrostat of 23° C.

and 55% RH for 24 hours. The present inventors placed the sample on a flat plate, calculated the curvature radius with the curve corresponding to that of the sample using a curvature scale, and ranked the size of the curl and easy handling in the following criteria:

Curvature radius: 1/radius of a curve having the curve corresponding to that of the sample (1/m)

A: 0 through 5 excl.
B: 5 through 10 excl.
C: 10 through 30 excl.
D: 30 or more where ranks A and B denote that the degree of easy handling meets the acceptable level, whereas the C and D indicate that handling characteristics are very poor.

(Yield Rate of Conforming Products when Bonding the Polarizing Plate Onto the Liquid Crystal Cell)

The present inventors separated the pre-bonded polarizing plate from the SONY-made 20 type display KLV-20AP2, and bonded the above prepared polarizing plates 1 through 22. This procedure was repeated ten times to get the yield rate of the conforming products. The result was evaluated according to the following criteria. Assuming that a polarizing plate loosened, containing an air bubble or a deviated angle is regarded as a nonconforming product, the yield rate was calculated according to the following equation:

Yield rate (%)=number of conforming products/(number of conforming products+number of nonconforming products)×100

A: yield rate: 95% or more without exceeding 100%
B: yield rate: 85% or more to 95 exclusive
C: yield rate: 70% or more to 85% exclusive
D: yield rate: less than 70%

The aforementioned results are listed in the following Table 3:

The above Table has demonstrated that the polarizing plate using the retardation film of the present invention is characterized by excellent curls and superb yield rate when bonded onto the liquid crystal cell.

Especially when the polarizing plate had thickness of 70 through 140 μm, it was found out that the ratio of film thicknesses (d2/d1) was 1.1 or more to 2.0 exclusive assuming that the retardation film has a thickness of d1 and the polarizing plate protective film has a thickness of d2. It was also found out that the retardation film and polarizing plate having been produced under the preferred manufacturing conditions of the present invention were provided with excellent curl characteristics and superb yield rate.

EXAMPLE 2

(Preparation of the Polarizing Plate Protective Films Provided with Antireflection Layer)

Using the above prepared polarizing plate protective films 201 through 203, the present inventors prepared the polarizing plate protective film provided with antireflection layer according to the following procedure.

The present inventors measured the refractive index of each layer constituting the antireflection layer according to the following method.

(Refractive Index)

The refractive index of each refractive index of the sample coated on the above prepared hard coated film separately for each layer was calculated from the result of measuring the spectral reflection factor by a spectrophotometer. After roughening the rear surface on the sample measuring side, the process of light absorption was applied by a black spray to prevent the light from being reflected on the rear surface. Then the spectrophotometer U-4000 (manufactured by Hita-

TABLE 3

| Polarizing plate No. | Phase difference film No. | Phase difference film Film thickness (μm) | Polarizing film Film thickness (μm) | Polarizing plate protective film No. | Polarizing plate protective film Film thickness (μm) | Thickness of polarizing film (μm) | Curl of polarizing plate | Yield rate | Remarks |
|---|---|---|---|---|---|---|---|---|---|
| 1  | 101 | 50 | 20 | 201 | 80 | 150 | B | B | Inv. |
| 2  | 102 | 50 | 20 | 201 | 80 | 150 | B | B | Inv. |
| 3  | 103 | 40 | 20 | 201 | 80 | 140 | A | A | Inv. |
| 4  | 104 | 50 | 20 | 201 | 80 | 150 | B | B | Inv. |
| 5  | 105 | 50 | 20 | 201 | 80 | 150 | D | D | Comp. |
| 6  | 106 | 50 | 20 | 201 | 80 | 150 | D | D | Comp. |
| 7  | 107 | 50 | 20 | 201 | 80 | 150 | B | B | Inv. |
| 8  | 108 | 50 | 20 | 201 | 80 | 150 | B | B | Inv. |
| 9  | 109 | 50 | 20 | 201 | 80 | 150 | B | B | Inv. |
| 10 | 110 | 40 | 20 | 201 | 80 | 140 | A | A | Inv. |
| 11 | 111 | 40 | 20 | 201 | 80 | 140 | A | A | Inv. |
| 12 | 112 | 20 | 20 | 202 | 60 | 100 | A | B | Inv. |
| 13 | 113 | 80 | 20 | 201 | 80 | 180 | D | D | Comp. |
| 14 | 114 | 40 | 20 | 201 | 80 | 140 | D | D | Comp. |
| 15 | 101 | 50 | 20 | 202 | 60 | 130 | A | A | Inv. |
| 16 | 101 | 50 | 20 | 203 | 40 | 110 | B | B | Inv. |
| 17 | 110 | 40 | 20 | 203 | 40 | 100 | A | B | Inv. |
| 18 | 111 | 40 | 20 | 201 | 80 | 140 | A | A | Inv. |
| 19 | 111 | 40 | 20 | 202 | 60 | 120 | A | A | Inv. |
| 20 | 111 | 40 | 20 | 203 | 40 | 100 | A | B | Inv. |
| 21 | 112 | 20 | 20 | 201 | 80 | 120 | B | B | Inv. |
| 22 | 112 | 20 | 20 | 203 | 40 | 80  | A | A | Inv. |

Inv.: Invention,
Comp.: Comparative example chi, Ltd.) was used to measure the reflection factor in the visible light area (400 nm through 700 nm) under the condition of five-degree specular reflection.

(Metallic Oxide Particle Size)

The present inventors measured the size of the metallic oxide particles to be used, by taking the steps of observing 100 particles for each by an electron microscope (SEM), assuming that the diameter of the circle circumscribing each of the particles was as a particle size, and calculated the average value thereof as the particle size.

<<Formation of Hard Coated Layer>>

The present inventors prepared the hard coated by taking the steps of filtering the following hard coated layer coating solution by a polypropylene-made filter having a pore size; preparing a hard coated layer coating solution; coating this solution on the above prepared polarizing plate protective films 201 through 203 by a micro-gravure coater; drying the same at 90° C.; curing the coated layer using the ultraviolet lamp under the condition that the intensity of illumination at the irradiation section was 100 mW/cm$^2$, and the amount of light applied was 0.1 J/cm$^2$; forming the hard coated layer having a dry film thickness of 5 μm, whereby a hard coated film was obtained.

(Hard coated layer coating solution)
The following materials were stirred and blended to get a hard coated layer coating solution.

| | |
|---|---|
| Acryl monomer: KAYARAD DPHA (dipentaerithritol hexaacrylate, manufactured by Nippon Kayaku Co.) | 220 parts by mass |
| Irgacure 184 (by Ciba Specialty Chemicals K.K) | 20 parts by mass |
| Propylene glycol monomethyl ether | 110 parts by mass |
| Ethyl acetate | 110 parts by mass |

<<Preparation of Polarizing Plate Protective Film with Antireflection Layer>>

The present inventors prepared the polarizing plate protective film with antireflection layer by coating the antireflection layers—the following high refractive index layer and the low refractive index layer in that order—on the above prepared hard coated film.

<<Formation of Antireflection Layer: High Refractive Index Layer>>

The present inventors coated the following high refractive index layer coating composition on the above prepared hard coated layer by an extrusion coater; dried the layer at 80° C. for one minute; cured the layer by application of 0.1 J/cm$^2$ of ultraviolet rays; and again heat-curing the layer at 100° C. for one minute, whereby a high refractive index layer having a thickness of 78 nm was formed.

This high refractive index layer had a refractive index of 1.62.

<High refractive index layer coating composition>

| | |
|---|---|
| Isopropyl alcohol solution of metallic oxide particles (20% solid, ITO particles, particle size: 5 nm) | 55 parts by mass |
| Metallic compound; Ti(OBu)$_4$ (tetra-n-butoxytitanium) | 1.3 parts by mass |
| Ionizing radiation curable resin: dipentaerithritol hexaacrylate | 3.2 parts by mass |
| Photo-polymerization initiator: Irgacure 184 (by Ciba Specialty Chemicals K.K) | 0.8 parts by mass |
| 10% propylene glycol monomethyl ether solution containing straight chain dimethyl silicone-EO block copolymer (FZ-2207, manufactured by Unicar Co., Ltd.) | 1.5 parts by mass |
| Propylene glycol monomethyl ether | 120 parts by mass |

-continued

<High refractive index layer coating composition>

| | |
|---|---|
| Isopropyl alcohol | 240 parts by mass |
| Methyl ethyl ketone | 40 parts by mass |

<<Formation of Antireflection Layer: Low Refractive Index Layer>>

The present inventors coated the following low refractive index layer coating composition on the above prepared high refractive index layer by an extrusion coater; dried the layer at 100° C. for one minute; cured the layer by application of 0.1 J/cm$^2$ of ultraviolet rays using an ultraviolet ray lamp; wound the film on a heat resistant plastic core to a winding length of 2500 m; heat-treated the film at 80° C. for three days, wherein polarizing plate protective films 301 through 303 with antireflection layer were produced.

This low refractive index layer had a thickness of 95 nm and a refractive index of 1.37.

(Preparation of Low Refractive Index Layer Coating Composition)

<Preparation of Tetraethoxysilane Hydrolysate A>

The present inventors prepared hydrolysate A by taking the steps of blending 289 g of tetraethoxysilane with 553 g of ethanol 553 g; adding 157 g of 0.15% aqueous acetic acid solution to the mixture; and stirring the mixture in a water bath of 25° C. for 30 hours.

| | |
|---|---|
| Tetraethoxysilane hydrolysate A | 110 parts by mass |
| Hollow silica particles dispersion liquid | 30 parts by mass |
| KBM503 (silane coupling agent, Shinetsu Chemical Co. Ltd.) | 4 parts by mass |
| 10% propylene glycol monomethyl ether solution containing straight chain dimethyl silicone-EO block copolymer (FZ-2207, manufactured by Unicar Co., Ltd.) | 3 parts by mass |
| Propylene glycol monomethyl ether | 400 parts by mass |
| Isopropyl alcohol | 400 parts by mass |

<Preparation of Hollow Silica Particles Dispersion Liquid>

A mixture of 100 g of silica sol having an average particle size of 5 nm and SiO$_2$ concentration of 20% by mass and 1900 g of demineralized water was heated to 80° C. This mother liquid for reaction had a pH value of 10.5. Then 9000 g of aqueous solution containing 0.98% by mass of sodium silicate as SiO$_2$ and 9000 g of aqueous solution containing 1.02% by mass of sodium aluminate as Al$_2$O$_3$ were added simultaneously to this mother liquid. During this time, the temperature of the reaction solution was kept at 80° C. Immediately after addition, the pH value of the reaction solution rose to 12.5, and there was almost no change thereafter. After addition was terminated, the reaction solution was cooled down to the room temperature, and the solution was rinsed by an ultrafiltration membrane. Thus, the nuclear particle dispersion liquid of SiO$_2$.Al$_2$O$_3$ having a solid concentration of 20% by mass was processed (Process (a)).

Then 1700 g of demineralized water was added to 500 g of this nuclear particles dispersion liquid 500 g and was heated to 98° C. While this temperature was kept unchanged, silicic acid solution (SiO$_2$ concentration: 3.5% by mass) was obtained by dealkalization of aqueous sodium silicate solution by the positive ion exchange resin. 3000 g of this silicic acid solution was added to the mixture. Thus, the present inventors prepared the dispersion liquid of nuclear particles with the first silica coated layer formed thereon (Process (b)).

Then 1125 g of demineralized water was added to 500 g of the nuclear particles dispersion liquid wherein the first silica coated layer having a solid concentration of 13% by mass by rinsing with the ultrafiltration membrane was formed. Further, the concentrated sulfuric acid (35.5%) was added until the pH value reached 1.0, and the process of dealuminization was applied. Then while adding 10 L of aqueous hydrochloric acid solution having a pH value of 3 and 5 L of demineralized water, the aluminum salts having been dissolved by the ultrafiltration membrane was separated. Thus, the present inventors prepared the dispersion liquid of $SiO_2.Al_2O_3$ porous particles (Process (c)), wherein part of the constituents of the nuclear particles forming the first silica coated layer was removed. A mixture of 1500 g of the porous particles dispersion liquid, 500 g of demineralized water, 1750 g of ethanol and 626 g of 28% aqueous ammonia solution was heated to 35° C. Then 104 g of ethyl silicate ($SiO_2$ 28% by mass) was added to this mixture, and the surface of the porous particles having formed the first silica coated layer was covered with an ethyl hydrolyzed polycondensate, thereby forming the second silica coated layer. Thus, the hollow silica particles dispersion liquid having a solid concentration of 20% by mass was prepared using the ultrafiltration membrane, wherein the solvent was replaced by ethanol.

The first silica coated layer of this hollow silica particles had a thickness of 3 nm, an average particle size of 47 nm, a $MOx/SiO_2$ (mole ratio) of 0.0017 and a refractive index of 1.28. In this case, the average particle size was measured by the dynamic light scattering method.

The polarizing plates 301 through 322, and liquid crystal display apparatuses 301 through 322 were prepared so as to correspond to the structures of the polarizing plates 1 through 22, and liquid crystal display apparatuses 1 through 22 of the Example 1, in the same procedure as that of Example 1, using the polarizing plate protective films 301 through 303 with antireflection layers having been prepared, and the retardation films 101 through 114 prepared in Example 1.

Using the same procedure as that of the Example 1, the present inventors evaluated the yield rate of the polarizing plate and liquid crystal display apparatus having been prepared, when the polarizing plate curl and polarizing plate were bonded to the liquid crystal cell. The Example 1 was reproduced, and it was found out that the polarizing plate and liquid crystal display apparatus with the retardation film of the present invention incorporated therein each were provided with excellent characteristics. Further, use of the polarizing plate protective films 301 through 303 equipped with antireflection layer improved the visibility of the liquid crystal display apparatus, brought about a substantial reduction in the undesired image capturing in the periphery of the screen, and improved the resistance to damages.

EXAMPLE 3

The present inventors prepared the following retardation films 401 through 403 in the same procedure as that of Example 1 except that the following process of heat treatment was added, when the retardation film 101 of the Example 1.

<Heat Treatment>

The present inventors produced a film by taking the steps of drawing the web by the tenter, and drying the web by dry air at 105° C. until the amount of residual solvent was reduced to 0.3% by mass in the process of conveyance and drying by the roll with a plurality of webs arranged on the upper and lower portions thereof. After that, the film having been produced was pressurized at a pressure of 10 kPa along the thickness of the film by the nip rolls provided in multiple stages, when the film was heat-treated for 20 minutes in an atmosphere of 110° C. with the atmosphere change rate amounting to 25 times per hour. After that, the film was cooled down to the room temperature and was taken up. Thus, the present inventors produces a retardation film 401 having a thickness of 50 μm wherein a 1-cm wide, 8-μm high knurled portion was arranged on the end.

The present inventors prepared the retardation films 402 through 403 in the same procedure, except that the heat treatment temperature, atmosphere change rate, and presence or absence of pressurization were changed to meet the conditions listed in Table 4, and the radius of free volume was controlled.

Assuming that the atmospheric volume of the heat treatment chamber is V (m³), and the volume of fresh-air supplied is FA (m³/hr), the atmosphere change rate of the aforementioned heat treatment process can be defined as the number of times the atmosphere per unit time calculated by the following expression is replaced by the fresh air.

Atmosphere change rate=$FA/V$(number of times/hour)

<Measurement of Radius of Free Volume Calculated by Positron Annihilation Lifetime Measurement>

The present inventors measured the radius of free volume of each retardation film according to the aforementioned Positron Annihilation Lifetime measurement method.

TABLE 4

| | | Bending conditions | | | | | | | Radius of free | Retardation value | | Film front and rear | | Difference in | |
| --- | --- | --- | --- | --- | --- | --- | --- | --- | --- | --- | --- | --- | --- | --- | --- |
| | | Atmospheric | | | | | | | | | | | | | |
| *1 | Cellulosic ester | temperature (° C.) | *2 | *3 | *4 | *5 | *6 | *7 | volume (nm) | Ro (nm) | Rt (nm) | Rear | Front | refractive indexes | Remarks |
| 401 | C | 120 | 0.022 | 350 | 50 | 135 | 25 | 10 | 0.250 | 51 | 145 | 1.48521 | 1.48242 | 0.00279 | Inv. |
| 402 | C | 120 | 0.022 | 350 | 50 | 110 | 12 | — | 0.310 | 48 | 141 | 1.48521 | 1.48125 | 0.00396 | Inv. |
| 403 | C | 120 | 0.022 | 350 | 50 | 100 | — | — | 0.315 | 38 | 128 | 1.47995 | 1.47501 | 0.00494 | Inv. |

*1: Phase difference film No.
*2: 1/a (mm⁻¹) assuming that the radium of the film being bent is assumed as a (mm)
*3: Number of bending operations (number of times),
*4: Film thickness (μm)
*5: Heat treatment temperature (° C.)
*6: Atmosphere change rate (number of times/hour)
*7: Pressurization (kPa)
Inv.: Invention Using the above prepared retardation films 401 through 403, the polarizing plate protective films 301 and 302 with antireflection layer prepared in the Example 2 and the polyvinyl alcohol polarizing film (having a thickness of 20 μm), the present inventors prepared the polarizing plates 401 through 406, and liquid crystal display apparatuses 401 through 406 having the composition listed in Table 5 in the same procedure as that of the Examples 1 and 2. They evaluated the yield rate when the polarizing plate curl and polarizing plate were bonded to the liquid crystal cell. The results are given in Table 5.

TABLE 5

| Polarizing plate No. | Phase difference film No. | Phase difference film Film thickness (μm) | Polarizing film Film thickness (μm) | Polarizing plate protective film No. | Polarizing plate protective film Film thickness (μm) | Thickness of polarizing film(μm) | Curl of polarizing plate | Yield rate | Remarks |
|---|---|---|---|---|---|---|---|---|---|
| 401 | 401 | 50 | 20 | 301 | 80 | 150 | A | A | Inv. |
| 402 | 401 | 50 | 20 | 302 | 60 | 130 | A | A | Inv. |
| 403 | 402 | 50 | 20 | 301 | 80 | 150 | A | B | Inv. |
| 404 | 402 | 50 | 20 | 302 | 60 | 130 | A | A | Inv. |
| 405 | 403 | 50 | 20 | 301 | 80 | 150 | B | B | Inv. |
| 406 | 404 | 50 | 20 | 302 | 60 | 130 | A | A | Inv. |

Inv.: Invention

The polarizing plates 401 through 404 using the retardation films 401 and 402 wherein bending operation of the present invention is performed and the radius of free volume has been adjusted to the preferred range of 0.250 through 0.310 nm have been found to provide excellent polarizing plate curl characteristics and yield rate, as compared with the polarizing plates 405 and 406. Especially the polarizing plates 401 and 402 using the retardation film 401 to which the process of pressurization has been applied have been found to provide excellent curl characteristics and yield rate unaffected by the thickness of the polarizing plate.

What is claimed is:

1. A film bonded to a polarizer of a polarizing plate, having:
an A-side surface and a B-side surface opposite to the A-side surface; and
a thickness of 10 μm to 70 μm;
wherein a refractive index difference between the A-side surface and the B-side surface is $5 \times 10^{-4}$ to $5 \times 10^{-3}$.

2. The film described in claim 1, wherein the film is a retardation film and the retardation film has an in-plane retardation Ro of 30 nm to 300 nm and a thickness direction retardation Rt of 80 nm to 400 nm for light having a wavelength of 590 nm,
where the in-plane retardation Ro and the thickness direction retardation Rt are obtained by the following formulas:

$$Ro=(nx-ny) \times d$$

$$Rt=\{(nx+ny)/2-nz\} \times d,$$

in the formulas, nx represents a refractive index in the direction of a slow axis in a film plane, ny represents a refractive index in the direction of a fast axis in the film plane, nz represents a refractive index in the direction along a film thickness, and d is a film thickness (nm).

3. The film described in claim 1, wherein the film is a protective film.

4. The film described in claim 1, wherein the film contains a cellulose ester as a main component.

5. The film described in claim 4, wherein the film satisfies the following formulas (I) and (II):

$$2.0 \leq X+Y \leq 2.6 \quad \text{Formula (I)}$$

$$0.1 \leq Y \leq 1.2 \quad \text{Formula (II)}$$

where X represents a substitution degree of an acetyl group of the cellulose ester and Y represents a substitution degree of a propionyl group or a butyryl group of the cellulose ester.

6. The film described in claim 4, wherein the film contains a plasticizer in the range of from 1% by mass to 20% by mass for the cellulose ester.

7. The film described in claim 6, wherein the content of the plasticizer is in the range of from 3% by mass to 13% by mass.

8. A polarizing plate, comprising:
a polarizer; and
the film described in claim 1 and bonded to a first surface of the polarizer;
wherein the polarizing plate has a thickness of 70 μm to 140 μm.

9. The polarizing plate of claim 8, wherein the film is a retardation film having a thickness d1 and the polarizing plate further comprises a protective film bonded to a second surface of the polarizer opposite to the first surface and having a thickness d2, and wherein a thickness ratio (d2/d1) of the protective film to the retardation film is 1.1 to 4.0.

10. The polarizing plate of claim 9, wherein the thickness ratio (d2/d1) is 1.1 to 2.0.

11. A liquid crystal display apparatus, comprising:
a liquid crystal cell,
the polarizing plate described in claim 8 and bonded to an observation side of the liquid crystal cell,
wherein the polarizing plate is bonded in such a way that the film bonded to the first surface of the polarizer is located between the polarizer and the liquid crystal cell.

12. The liquid crystal display apparatus described in claim 11, wherein a protective surface is bonded to a second surface of the polarizer.

13. The liquid crystal display apparatus described in claim 12, wherein the protective film bonded to the second surface of the polarizer includes at least one of a reflection preventing layer, an antistatic layer, and an antiglare layer.

14. A method of producing a film bonded to a polarizer of a polarizing plate, comprising steps of:

casting a liquid onto a support to form a web;
peeling off the web from the support;
conveying the web
drying the conveyed web;
cutting the web so as to form a film having a predetermined size and a thickness of 10 µm to 70 µm;
wherein the conveying step comprises a bending step of bedding the web in such a manner that an A-side surface and a B-side surface opposite to the A-side surface of the web becomes an inner surface alternately, and
wherein in the bending step, when "a" represents a bending radius of the web at the time that the web is bent, a value of (1/a) is in the range of 0.013 to 0.033 mm$^{-1}$, and the bending is repeated from 150 times to 1000 times.

15. The method described in claim 14, wherein the surface of the web contacting the support is the B-side surface and the surface of the web not contacting the support is the A-side surface, the refractive index of the B-side surface is made higher than that of the A-side surface by the bending and a refractive index difference between the A-side surface and the B-side surface is $5\times10^{-4}$ to $5\times10^{-3}$.

16. The method described in claim 14, wherein the value of (1/a) is 0.017 to 0.025 mm$^{-1}$.

17. The method described in claim 14, wherein the bending is repeated 250 times or more.

18. The method described in claim 17, wherein the bending is repeated 350 times or more.

19. The method described in claim 14, wherein in the bending step, an atmosphere temperature is ±30° C. of a glass transition temperature of the web.

20. The method described in claim 19, wherein the atmosphere temperature is ±20° C. of the glass transition temperature of the web.

21. The method described in claim 14, wherein in the bending step, an atmosphere is an inert gas.

22. The method described in claim 14, wherein in the bending step, a conveying speed is 10 m/min. to 150 m/min.

23. The method described in claim 14, further comprising:
a stretching step of stretching the conveyed web before the drying step,
wherein the film is a retardation film and the retardation film has an in-plane retardation Ro of 30 nm to 300 nm and a thickness direction retardation Rt of 80 nm to 400 nm for light having a wavelength of 590 nm,
where the in-plane retardation Ro and the thickness direction retardation Rt are obtained by the following formulas:

$$Ro=(nx-ny)\times d$$

$$Rt=\{(nx+ny)/2-nz\}\times d,$$

in the formulas, nx represents a refractive index in the direction of a slow axis in a film plane, ny represents a refractive index in the direction of a fast axis in a film plane, nz represents a refractive index in the direction along a film thickness, and d is a film thickness (nm).

* * * * *